United States Patent
Ohta et al.

(10) Patent No.: US 8,701,158 B2
(45) Date of Patent: Apr. 15, 2014

(54) INFORMATION PROCESSING SYSTEM, APPARATUS, METHOD, AND PROGRAM STORAGE MEDIUM

(75) Inventors: Shingo Ohta, Kanagawa (JP); Takuya Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 13/354,543

(22) Filed: Jan. 20, 2012

(65) Prior Publication Data

US 2012/0198534 A1 Aug. 2, 2012

(30) Foreign Application Priority Data

Jan. 27, 2011 (JP) ................................ 2011-014707

(51) Int. Cl.
*G06F 21/00* (2013.01)
*G06F 21/31* (2013.01)
*G06F 21/44* (2013.01)
G06F 21/60 (2013.01)
H04L 29/06 (2006.01)
H04W 12/06 (2009.01)

(52) U.S. Cl.
CPC .............. *G06F 21/31* (2013.01); *G06F 21/445* (2013.01); *G06F 21/608* (2013.01); *H04L 63/12* (2013.01); *H04W 12/06* (2013.01); *G06F 21/606* (2013.01)
USPC .................. 726/2; 726/28; 713/155; 713/182; 713/169

(58) Field of Classification Search
CPC ... G06F 21/606; G06F 21/608; G06F 21/445; G06F 21/31; H04L 63/12; H04W 12/06
USPC ........ 726/4, 8, 17, 21, 28, 2, 3; 713/155, 182, 713/168–170; 380/229, 232, 258
See application file for complete search history.

(56) References Cited

U.S. PATENT DOCUMENTS

2004/0010697 A1 * 1/2004 White ........................... 713/186

FOREIGN PATENT DOCUMENTS

| JP | 2008-176428 | | 7/2008 |
| JP | 2010-72760 | | 4/2010 |
| JP | 2010-74431 | | 4/2010 |
| JP | 2010072760 A | * | 4/2010 |

* cited by examiner

*Primary Examiner* — Fikremariam A Yalew
*Assistant Examiner* — Kendall Dolly
(74) *Attorney, Agent, or Firm* — Oblon, Spivak, McClelland, Maier & Neustadt, L.L.P.

(57) ABSTRACT

An information processing system includes a plurality of information processing apparatuses, each apparatus including a transmission unit and a verification unit, and a plurality of authentication servers connectable to the plurality of information processing apparatuses via one or more networks. When one information processing apparatus, used as a receiving apparatus, receives a request of executing a processing at the receiving apparatus from other information processing apparatus, used as a requesting apparatus, the transmission unit of requesting apparatus transmits information to the receiving apparatus, and the verification unit of receiving apparatus determines whether the requested processing can be executed at the receiving apparatus for a user of the receiving apparatus based on a comparison of the information transmitted from the requesting apparatus and information settable for the receiving apparatus by using the authentication server useable for user verification of the information processing apparatuses.

20 Claims, 12 Drawing Sheets

FIG. 5A

| ITEM | DATA |
|---|---|
| USER NAME | USER Q |
| AUTHENTICATION METHOD | FIRST AUTHENTICATION SERVER |
| USER ID | 123456 |
| LOGIN NAME | q_xxxx |
| PASSWORD | q_yyyy |
| LOGIN DATE | 2010. 09. xx |
| LOGIN APPARATUS | MFP A |
| USER TYPE AT LOGIN APPARATUS | GENERAL USER |
| ACCESS LIMITATION INFORMATION AT LOGIN APPARATUS | COPYING FUNCTION: ALLOWED (O) |
| | FACSIMILE COMMUNICATION FUNCTION: ALLOWED (O) |
| | PRINTING FUNCTION: NOT ALLOWED (×) |

FIG. 5B

| ITEM | DATA |
|---|---|
| USER NAME | USER Q |
| AUTHENTICATION METHOD | FIRST AUTHENTICATION SERVER |
| LOGIN DATE | 2010. 09. xx |
| LOGIN APPARATUS | MFP A |
| USER TYPE AT LOGIN APPARATUS | GENERAL USER |
| ACCESS LIMITATION INFORMATION AT LOGIN APPARATUS | COPYING FUNCTION: ALLOWED (O) |
| | FACSIMILE COMMUNICATION FUNCTION: ALLOWED (O) |
| | PRINTING FUNCTION: NOT ALLOWED (×) |

FIG. 6

| AUTHENTICATION METHOD AT PROCESS-REQUEST-RECEIVING APPARATUS | AUTHENTICATION METHOD AT PROCESS REQUESTER APPARATUS | | |
|---|---|---|---|
| | LOCAL AUTHENTICATION | FIRST AUTHENTICATION SERVER | SECOND AUTHENTICATION SERVER |
| LOCAL AUTHENTICATION | × | × | × |
| FIRST AUTHENTICATION SERVER | × | ○ | × |
| SECOND AUTHENTICATION SERVER | × | × | ○ |

INFORMATION PROCESSING SYSTEM, APPARATUS, METHOD, AND PROGRAM STORAGE MEDIUM

CROSS-REFERENCE TO RELATED APPLICATION

This application claims priority to Japanese Patent Application No. 2011-014707, filed on Jan. 27, 2011 in the Japan Patent Office, which is incorporated by reference herein in its entirety.

BACKGROUND

1. Technical Field

The present invention relates to an information processing system employing an information processing apparatus such as a facsimile machine, a printer, a scanner, a copier, a multi-functional apparatus, or a personal computer, an information processing method, and a storage medium storing a software program for implementing the information processing method.

2. Description of the Background Art

In a typical network environment, a user can use information processing apparatuses such as facsimile machines, printers, scanners, copiers, and multi-functional apparatuses (collectively, "image forming apparatuses") and personal computers connected on a network using the user's identification (ID) and password. For example, the user registers his user ID and password in an authentication server connected on a network. Then, when the user wishes to use a particular multi-functional apparatus, known as a multi-functional peripheral (MFP), the user inputs his user ID and password to the MFP that he wants to use, and then the MFP transmits the input ID and password to the authentication server. If the authentication server confirms that the received ID and password match the ID and password registered in the authentication server, the authentication server reports the user verification success to the MFP. Upon receiving the user verification success from the authentication server, the MFP allows the user to use the MFP. Such information processing system is disclosed, for example, in JP-2008-176428-A.

However, in such a conventional information processing system, if the user wants to conduct a given processing using a plurality of MFPs connected to each other via a network, the user needs to conduct the above-described authentication process for each one of the MFPs, which is time-consuming process.

SUMMARY

In one aspect of the present invention, an information processing system is devised. The information processing system includes a plurality of information processing apparatuses, each of the information processing apparatuses including a transmission unit and a verification unit; and a plurality of authentication servers communicably connected to the plurality of information processing apparatuses via one or more networks. The plurality of information processing apparatuses and the plurality of authentication servers are grouped into a plurality of groups including at least a first group and a second group. The first group includes a plurality of information processing apparatuses and a first authentication server communicably connected to each other via a network. The first authentication server stores user information of one or more users that use the information processing apparatuses in the first group. The first authentication server conducts user authentication of users that use each of the information processing apparatuses in the first group by comparing the stored user information and user information input by a user to any one of the plurality of information processing apparatuses, and when the stored user information and the input user information input are identical, the first authentication server issues a user verification success to the information processing apparatuses that has transmitted the user information to the first authentication server, and the information processing apparatus that receives the user verification success allows the user to use the information processing apparatus. The second group includes a plurality of information processing apparatuses and a second authentication server connected to each other via a network. The second authentication server stores user information of one or more users that use the information processing apparatuses in the second group. The second authentication server conducts user authentication of users that use each of the information processing apparatuses in the second group by comparing the stored user information and user information input by a user to any one of information processing apparatuses, and when the stored user information and the input user information input being identical, the second authentication server issues a user verification success to the information processing apparatuses that has transmitted the user information to the second authentication server, and the information processing apparatus that receives the user verification success allows the user to use the information processing apparatus. The information processing apparatuses and first authentication server in the first group and the information processing apparatuses and second authentication server in the second group are communicably connected to each other. When one information processing apparatus disposed in the first group receives a request of executing a given processing at the one information processing apparatus from other information processing apparatus disposed in either the first group or the second group, the transmission unit of the other information processing apparatus transmits identification information of the authentication server that the other information processing apparatus uses for the user authentication of the other information processing apparatus to the one information processing apparatus disposed in the first group together with the execution request of given processing, in which the one information processing apparatus disposed in the first group is used as a receiving apparatus, and the other information processing apparatus disposed in the first group or the second group is used as a requesting apparatus. When the receiving apparatus receives the identification information of the authentication server that the requesting apparatus uses for the user authentication of the requesting apparatus, the verification unit of the receiving apparatus compares the identification information of the authentication server received from the requesting apparatus and identification information of the authentication server that the receiving apparatus uses for the user authentication of the receiving apparatus. When the verification unit of the receiving apparatus determines that the identification information of the authentication server received from the requesting apparatus and the identification information of the authentication server for the user authentication of the receiving apparatus are identical, verification success of the user of the requesting apparatus at the receiving apparatus is confirmed. The verification unit of the receiving apparatus allows the user of the requesting apparatus to use the receiving apparatus to execute the requested given processing.

In another aspect of the present invention, an information processing apparatus is devised. The information processing apparatus is useable for an information processing system including a plurality of information processing apparatuses communicably connected to a plurality of authentication servers via one or more networks. The information processing apparatus includes a transmission unit and a verification unit. The plurality of information processing apparatuses and the plurality of authentication servers are grouped into a plurality of groups including at least a first group and a second group. The first group includes a plurality of information processing apparatuses and a first authentication server communicably connected to each other via a network. The first authentication server stores user information of one or more users that use the information processing apparatuses in the first group. The first authentication server conducts user authentication of users that use each of the information processing apparatuses in the first group by comparing the stored user information and user information input by a user to any one of information processing apparatuses, and when the stored user information and the input user information input being identical, the first authentication server issues a user verification success to the information processing apparatuses that has transmitted the user information to the first authentication server, and the information processing apparatus that receives the user verification success allows the user to use the information processing apparatus. The second group includes a plurality of information processing apparatuses and a second authentication server connected to each other via a network. The second authentication server storing user information of one or more users that use the information processing apparatuses in the second group. The second authentication server conducts user authentication of users that use each of the information processing apparatuses in the second group by comparing the stored user information and user information input by a user to any one of information processing apparatuses, and when the stored user information and the input user information input being identical, the second authentication server issues a user verification success to the information processing apparatuses that has transmitted the user information to the second authentication server, and the information processing apparatus that receives the user verification success allows the user to use the information processing apparatus. The information processing apparatuses and first authentication server of the first group and the information processing apparatuses and second authentication server of the second group are communicably connected to each other. When one information processing apparatus disposed in the first group receives a request of executing a given processing at the one information processing apparatus from other information processing apparatus disposed in either the first group or the second group, the transmission unit of the other information processing apparatus transmits identification information of an authentication server that the other information processing apparatus uses for the user authentication of the other information processing apparatus to the one information processing apparatus disposed in the first group together with the execution request of given processing, in which the one information processing apparatus disposed in the first group is used as a receiving apparatus and the other information processing apparatus disposed in the first group or the second group is used as a requesting apparatus. When the receiving apparatus receives the identification information of the authentication server that the requesting apparatus uses for the user authentication of the requesting apparatus, the verification unit of the receiving apparatus compares the identification information of the authentication server received from the requesting apparatus and identification information of the authentication server that the receiving apparatus uses for the user authentication of the receiving apparatus. When the verification unit of the receiving apparatus determines that the identification information of the authentication server received from the requesting apparatus and the identification information of the authentication server for the user authentication of the receiving apparatus are identical, verification success of the user of the requesting apparatus at the receiving apparatus is confirmed. The verification unit of the receiving apparatus allows the user of the requesting apparatus to use the receiving apparatus to execute the requested given processing.

In another aspect of the present invention, a non-transitory computer-readable medium is devised. The non-transitory computer-readable medium stores a program product for processing information on an information processing system configured to cause a computer to perform a method of processing information. The information processing system includes a plurality of information processing apparatuses, each of the information processing apparatuses including a transmission unit and a verification unit, and a plurality of authentication servers connectable to the plurality of information processing apparatuses via one or more networks. The plurality of information processing apparatuses and the plurality of authentication servers are grouped into a plurality of groups including at least a first group and a second group. The first group includes a plurality of information processing apparatuses and a first authentication server communicably connected to each other via a network. The first authentication server stores user information of one or more users that use the information processing apparatuses in the first group. The first authentication server conducts user authentication of users that use each of the information processing apparatuses in the first group by comparing the stored user information and user information input by a user to any one of information processing apparatuses, and when the stored user information and the input user information input being identical, the first authentication server issues a user verification success to the information processing apparatuses that has transmitted the user information to the first authentication server, and the information processing apparatus that receives the user verification success allows the user to use the information processing apparatus. The second group includes a plurality of information processing apparatuses and a second authentication server connected to each other via a network. The second authentication server storing user information of one or more users that use the information processing apparatuses in the second group. The second authentication server conducts user authentication of users that use each of the information processing apparatuses in the second group by comparing the stored user information and user information input by a user to any one of information processing apparatuses, and when the stored user information and the input user information input being identical, the second authentication server issues a user verification success to the information processing apparatuses that has transmitted the user information to the second authentication server, and the information processing apparatus that receives the user verification success allows the user to use the information processing apparatus. The information processing apparatuses and first authentication server of the first group and the information processing apparatuses and second authentication server of the second group are communicably connected to each other. The method comprising the steps of: receiving a request of executing a given processing at one information processing apparatus disposed in the first group from other information processing apparatus disposed in either the first group or the second group; transmitting identification information of an authentication server that the other information processing apparatus uses for the user authentication of the other information processing apparatus to the one information processing apparatus disposed in the first group together with the execution request of given processing, in which the one information processing apparatus disposed in the first group is used as a receiving apparatus, and the other information processing apparatus disposed in the first group or the second group is used as a requesting apparatus; receiving the identification information of the authentication server that the requesting apparatus uses for the user authentication of the requesting apparatus at the receiving apparatus; comparing the identification information of the authentication server received from the requesting apparatus and identification information of the authentication server that the receiving apparatus uses for the user authentication of the receiving apparatus by using the verification unit of the receiving apparatus; determining whether the identification information of the authentication server received from the requesting apparatus and the identification information of the authentication server for the user authentication of the receiving apparatus are identical by using the verification unit of the receiving apparatus; and allowing the user of the requesting apparatus to use the receiving apparatus to execute the requested given processing when a user verification success of the user of the requesting apparatus at the receiving apparatus is confirmed at the determining step.

BRIEF DESCRIPTION OF THE DRAWINGS

A more complete appreciation of the disclosure and many of the attendant advantages and features thereof can be more readily obtained and understood from the following detailed description with reference to the accompanying drawings, wherein:

FIGS. 5A and 5B show examples of job data when requesting execution of a job from one apparatus to another apparatus;

FIG. 6 is an example table showing an authentication method involving a requesting apparatus and a receiving apparatus in the information processing system;

Figure 1:
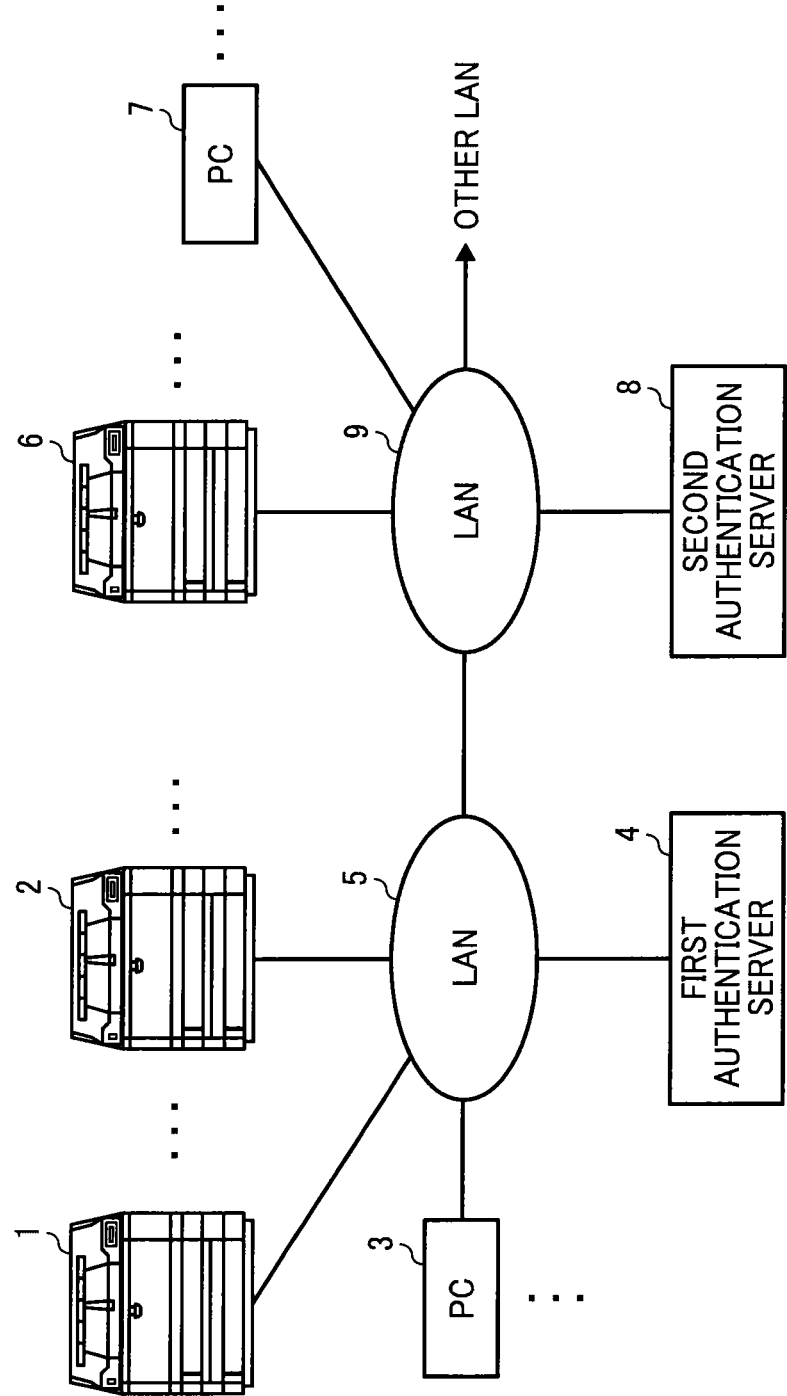
FIG. 1 shows one example configuration of an information processing system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention. In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

FIG. 1 shows an example environment of an information processing system according to an example embodiment. The information processing system can be configured using a network such as a wide area network (WAN) having a plurality of local area networks LANs (e.g., LANs 5 and 9), and can be further connected to the Internet.

The LAN 5 is communicably connected to one or more image forming apparatuses such as multi-functional peripherals (MFP) 1 and 2, a personal computer (PC) 3, a facsimile machine, a printer, a scanner, and a copier used by a user, a database server, a print server, and a first authentication server 4, and so on. The first authentication server 4 is used for user authentication of the apparatuses connected via the LAN 5. The user authentication may be also referred to user verification.

Further, similar to the LAN 5, the LAN 9 is communicably connected to a plurality of apparatuses such as MFP 6 and PC 7, and a second authentication server 8 for user authentication of the apparatuses connected via the LAN 9. Similar to the LANs 5 and 9, other LAN can be communicably connected to a plurality of apparatuses and such other LAN can be communicably connected to the LANs 5 and 9.

Each of the MFPs 1, 2, and 6 can be used as an image forming apparatus having a plurality of functions such as an image scanning function (e.g., scanner), a printing function, a copying function, a facsimile communication function, an e-mail communication function, and an image processing function. Each of the PCs 3 and 7 can be used as a computer having a plurality of functions such as data preparation such as document, table, figures, images, and data conversion function.

In the following example embodiments, the apparatuses connected on the LAN 5 can be used only by users registered in advance (registered users), and the first authentication server 4 is used to check and verify whether a user is allowed to use the apparatuses connected on the LAN 5. Specifically, the user information is stored and registered in the first authentication server 4 in advance, and used as the registered user information. Upon receiving the user information from each of the apparatuses, the first authentication server 4 compares the received user information and the registered user information, and reports a comparison result (hereinafter, comparison) to each of the apparatuses. The user authentication can be conducted as such.

Similar to the first authentication server 4, the second authentication server 8 conducts the user authentication to each of the apparatuses connected on the LAN 9. Further, other authentication server conducts the user authentication similarly.

As for the information processing system, a user can use any one of the apparatuses connected on the LAN 5 such as the MFPs 1 and 2, and the PC 3 as follows. At first, the user registers the user information to the first authentication server 4, which conducts the user authentication for each of the apparatuses. When the user authentication is verified by the first authentication server 4 (user verification success), the user can use the each of the apparatuses connected on the LAN 5, which means if the user authentication is not verified by the first authentication server 4 (user verification failure), the user cannot use each of the apparatuses connected on the LAN 5.

Further, the user can use any one of the apparatuses connected on the LAN 9 such as the MFP 6, and the PC 7 as follows. At first, the user registers the user information to the second authentication server 8, which conducts the user authentication for each of the apparatuses. When the user authentication is verified by the second authentication server 8 (user verification success), the user can use the each of the apparatuses connected on the LAN 9, which means if the user authentication is not verified by the second authentication server 8 (user verification failure), the user cannot use each of the apparatuses connected on the LAN 9. For example, a user registers his user information to the first authentication server 4. When the user wants to use the MFP 1 connected on the LAN 5, the user inputs the user information to the MFP 1, and then the first authentication server 4 conducts the user authentication, by which the user can use the MFP 1.

Figure 2:
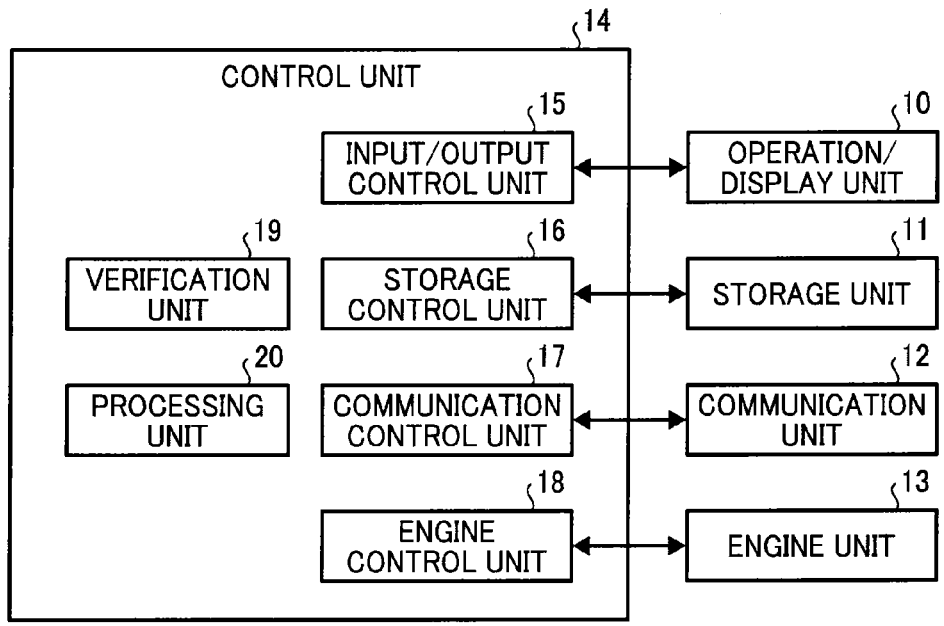
FIG. 2 shows a schematic block diagram of multi-functional peripherals (MFP)
Figure 3:
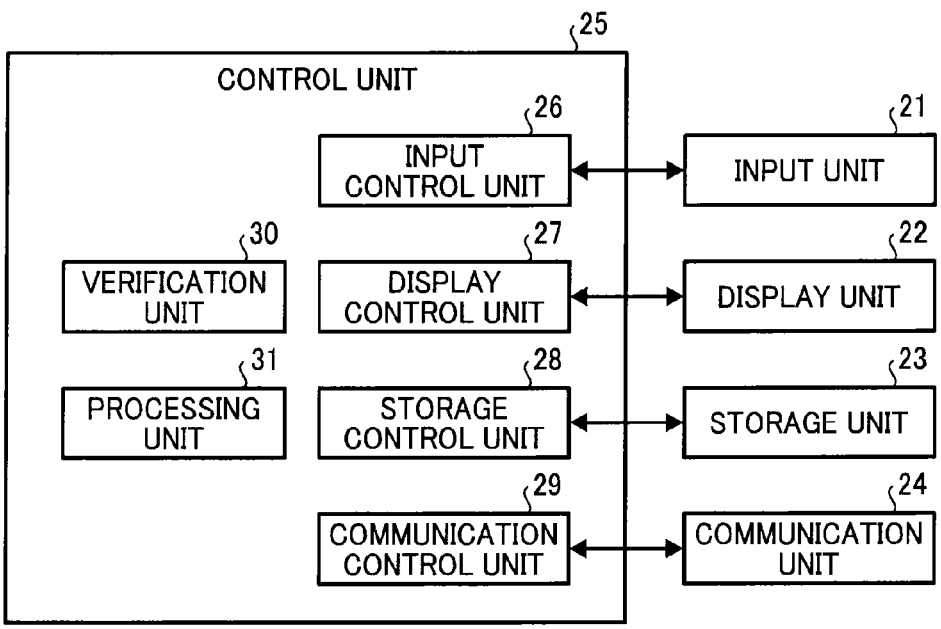
FIG. 3 shows a schematic block diagram of a personal computer (PC)
Figure 4:
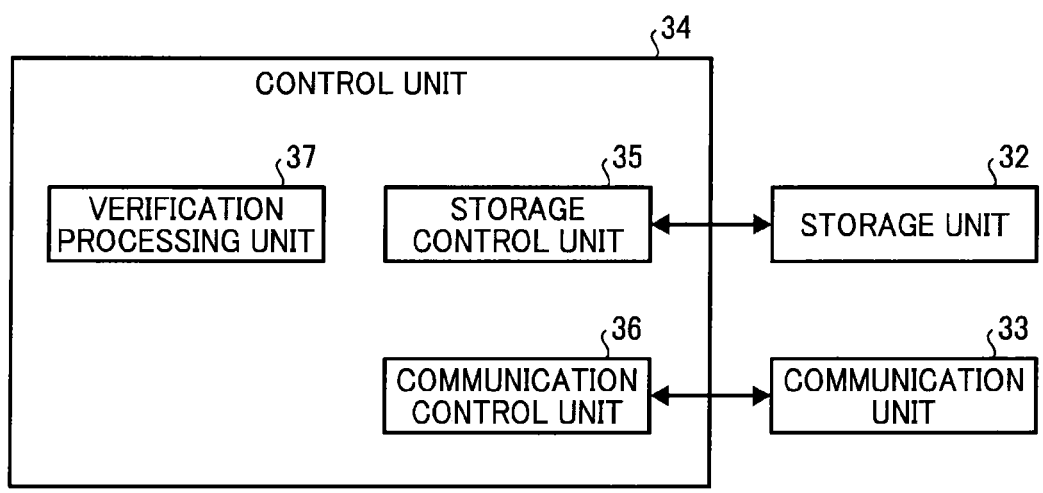
FIG. 4 shows a schematic block diagram of a first authentication server and a second authentication server.

With reference to FIGS. 2, 3, and 4, descriptions are given of a configuration of the MFPs 1, 2, and 6, a configuration of the PCs 3 and 7, and a configuration of the first authentication server 4 and second authentication server 8 shown in FIG. 1. FIG. 2 shows a block diagram of a configuration of the MFP 1, 2, and 6, FIG. 3 shows a block diagram of a configuration of the PCs 3 and 7, and FIG. 4 shows a block diagram of a configuration of the first authentication server 4 and the second authentication server 8.

As shown in FIG. 2, each of the MFP 1, 2, and 6 includes an operation/display unit 10, a storage unit 11, a communication unit 12, and an engine unit 13. A user may use the operation/display unit 10 to input various types of operation information, and the operation/display unit 10 has an operation panel or a control panel to display various types of information to report such information to the user. The storage unit 11 may include a hard disk drive (HDD) to store various software programs to be implemented by the MFP and various data to be processed. The communication unit 12 is used to conduct data communication between the MFP and an external apparatus using a network such as LAN, WAN, and the Internet, and facsimile communication using a communication line such as a public line. The engine unit 13 includes a scanner unit and a print unit employing known configurations and operations. The storage unit 11 stores various information such as user information, use-allowable function information or the like.

As shown in FIG. 2, each of the MFP 1, 2, and 6 further includes a control unit 14 configured as a micro-computer including a central processing unit (CPU), a read only memory (ROM), and a random access memory (RAM) to conduct controlling of the MFP as a whole. When a software program including a program prepared for implementing the processing according to example embodiment, stored in the ROM and/or storage unit 11, is loaded to the RAM used as a working area, the CPU executes the software program so that the control unit 14 can implement a plurality of functions such as an input/output control unit 15, a storage control unit 16, a communication control unit 17, an engine control unit 18, a verification unit 19, and a processing unit 20. The software program may be one or more programs. The control unit 14 can be used as a controller to control processing according to example embodiment. The control unit 14 can be configured using various types of processors, circuits, or the like such as a programmed processor, a circuit, an application specific integrated circuit (ASIC), used singly or in combination. In example embodiment, at least one of the units is implemented in hardware or as a combination of hardware/software.

The input/output control unit 15 conducts an input/output control process and a display control process of the operation/display unit 10. The storage control unit 16 conducts a data reading/writing control process for the storage unit 11. The communication control unit 17 conducts a data communication control process and a facsimile communication control process for the communication unit 12. The engine control unit 18 controls a scanning function, a printing function, and a copying function of the engine unit 13.

The verification unit 19 conducts given processing for the user authentication process for an apparatus. Specifically, the verification unit 19 of one apparatus can function as follows. When a user inputs the user information to one apparatus (referred to to-be-used apparatus), the verification unit 19 transmits the user information, input by the user to the to-be-used apparatus, to an authentication server used for the user authentication of the to-be-used apparatus, wherein such authentication server can be selected from authentication servers such as first authentication server 4 and second authentication server 8. Upon receiving the user verification success report from the authentication server, the verification unit 19 allows the user to use the to-be-used apparatus. In contrast, upon receiving the user verification failure report from the authentication server, the verification unit 19 does not allow the user to use the to-be-used apparatus. As such, the verification unit 19 can function as a use-allow determination unit to determine whether a concerned apparatus can be used or not by a user. Further, the verification unit 19 can control some functions to be implemented after determining whether the user is allowed to use the concerned apparatus such as allowing the use of the concerned apparatus, not allowing the use of the concerned apparatus, reporting of user verification failure, reporting reason of user verification failure, reporting user access right to concerned functions, controlling information to be displayed on a user interface, or the like.

The processing unit 20 conducts given processing for the to-be-used apparatus such as a scanning function, a printing function, a copying function, a data communication function, and a facsimile communication function, and conduct such processing by interlinking with other apparatus. When one apparatus such as MFP or PC transmits a request of given processing to other apparatus such as other MFP or PC, the one apparatus transmits such request to the other apparatus with following information, wherein such information may be identification information of an authentication server used for the user authentication of the to-be-used apparatus, which is used as a process requester apparatus or a requesting apparatus; user information required for the user authentication at the authentication server; identification information of user to identify the user of the to-be-used apparatus, which is used as a process requester apparatus or a requesting apparatus; and use-allowable function information specifying one or more functions that the user is allowed to use at a process requester apparatus or a requesting apparatus, but not limited thereto. As such, the processing unit 20 may also function as a transmission unit.

The processing unit 20 of each of the MFPs may function differently. For example, the processing unit 20 of one MFP includes all of the functions such as scanning, printing, copying, data communication, and facsimile communication functions, and the processing unit 20 of another MFP includes such functions without the facsimile communication function.

As shown in FIG. 3, each of the PCs 3 and 7 includes an input unit 21, a display unit 22, a storage unit 23, and a communication unit 24. The input unit 21 may include a keyboard, a pointing device, or the like used by a user to input various types of operation information. The display unit 22 may include a display device such as a liquid crystal display (LCD) to display various types of information to the user. The storage unit 23 may include a hard disk drive (HDD) to store various software programs to be implemented by each of the apparatuses and various data to be processed. The communication unit 24 is used to conduct data communication between a PC to be used by a user (to-be-used PC) and an external apparatus using a network such as LAN, WAN, and the Internet, and facsimile communication using a communication line such as a public line. The storage unit 23 stores various information such as the user information, use-allowable function information or the like.

As shown in FIG. 3, each of the PCs 3 and 7 further includes a control unit 25, configured as a micro-computer including a central processing unit (CPU), a read only memory (ROM), and a random access memory (RAM) to conduct controlling of the PC as a whole. When the software program including a program prepared for implementing the processing according to example embodiment, stored in the ROM and/or storage unit 23, is loaded to the RAM used as a working area, the CPU executes the software program so that the control unit 25 can implement a plurality of functions such as an input control unit 26, a display control unit 27, a storage control unit 28, a communication control unit 29, a verification unit 30, and a processing unit 31. The software program may be one or more programs. The control unit 25 can be used as a controller to control processing according to example embodiment. The control unit 25 can be configured using various types of processors, circuits, or the like such as a programmed processor, a circuit, an application specific integrated circuit (ASIC), used singly or in combination. In example embodiments, at least one of the units is implemented in hardware or as a combination of hardware/software.

The input control unit 26 conducts an input/output control of the input unit 21. The display control unit 27 conducts a display control process of the display unit 22. The storage control unit 28 conducts a data reading/writing control process for the storage unit 23. The communication control unit 29 conducts a data communication control process and a facsimile communication control process for the communication unit 24.

The verification unit 30 conducts given processing for the user authentication process for an apparatus. Specifically, the verification unit 30 of one apparatus can function as follows. When a user inputs the user information to one apparatus (referred to to-be-used apparatus), the verification unit 30 transmits the user information, input by the user to the to-be-used apparatus, to an authentication server used for the user authentication of the to-be-used apparatus, wherein such authentication server can be selected from authentication servers such as first authentication server 4 and second authentication server 8. Upon receiving the user verification success report from the authentication server, the verification unit 30 allows the user to use the to-be-used apparatus. In contrast, upon receiving the user verification failure report from the authentication server, the verification unit 30 does not allow the user to use the to-be-used apparatus. As such, the verification unit 30 can function as a use-allow determination unit to determine whether a concerned apparatus can be used or not by a user. Further, the verification unit 30 can control some functions to be implemented after determining whether the user is allowed to use the concerned apparatus such as allowing the use of the concerned apparatus, not allowing the use of the concerned apparatus, reporting of user verification failure, reporting reason of user verification failure, reporting user access right to concerned functions, controlling information to be displayed on a user interface, or the like.

The processing unit 31 conducts given processing for the to-be-used apparatus such as a scanning function, a printing function, a copying function, a data communication function, and a facsimile communication function, and conducts a given processing by interlinking with other apparatuses. When one apparatus such as MFP and PC transmits a request of given processing to other apparatus such as MFP and PC, the one apparatus transmits such request to other apparatus with following information, wherein such information may be identification information of an authentication server used for the user authentication of the to-be-used apparatus, which is used as a process requester apparatus or a requesting apparatus; user information required for the user authentication at the authentication server; identification information of user to identify the user of the to-be-used apparatus, which is used as a process requester apparatus or a requesting apparatus; and use-allowable function information specifying one or more functions that the user is allowed to use at a process requester apparatus or a requesting apparatus, or the like. As such, the processing unit 31 may also function as a transmission unit.

As shown in FIG. 4, each of the first authentication server 4 and the second authentication server 8 includes a storage unit 32 and a communication unit 33. The storage unit 32 may include a hard disk drive (HDD) to store various software programs to be implemented by the MFP, various data to be processed, and the user information used for the user authentication or verification for each of apparatuses connected on the LAN. The communication unit 33 is used to conduct a data communication process between the authentication server and an external apparatus using a network such as LAN, WAN, and the Internet. The storage unit 32 stores the user information of users that use a plurality of apparatuses such as MFP 1, MFP 2, PC 3, MFP 6, and PC 7. Specifically, the storage unit 32 of one authentication server stores the user information of users that use a plurality of apparatuses managed by such one authentication server.

Each of the first authentication server 4 and the second authentication server 8 further includes a control unit 34, configured as a micro-computer including a central processing unit (CPU), a read only memory (ROM), and a random access memory (RAM) to conduct controlling of the authentication server as a whole. When the software program including a program for implementing the user authentication, stored in the ROM and/or storage unit 32, is loaded to the RAM used as a working area, the CPU executes the software program so that the control unit 34 can implement a plurality of functions such as a storage control unit 35, a communication control unit 36, and a verification processing unit 37. The software program may be one or more programs. The control unit 34 can be used as a controller to control processing according to example embodiment. The control unit 34 can be configured using various types of processors, circuits, or the like such as a programmed processor, a circuit, an application specific integrated circuit (ASIC), used singly or in combination. In example embodiments, at least one of the units is implemented in hardware or as a combination of hardware/software.

The storage control unit 35 conducts a data reading/writing control process for the storage unit 32. The communication control unit 36 conducts a data communication process of the communication unit 33.

The verification processing unit 37 conducts a verification process of user of an external apparatus. Specifically, the verification processing unit 37 compares the user information received from the external apparatus such as MFP 1, MFP 2, PC 3, MFP 6, or PC 7, and the user information registered in the storage unit 32. When the received user information matches the registered user information (i.e., user information is identical), the user verification success report is transmitted to the external apparatus such as MFP 1, MFP 2, PC 3, MFP 6, or PC 7 that has transmitted the user information to the authentication server. In contrast, when the received user information does not match the registered user information (i.e., user information is not identical), the user verification failure report is transmitted to the external apparatus such as MFP 1, MFP 2, PC 3, MFP 6, or PC 7 that has transmitted the user information to the authentication server.

Further, each of the first authentication server 4 and the second authentication server 8 can be disposed with an input unit having a keyboard, a pointing device or the like useable by a user to input various types of operation information, and a display unit having a display device such as a liquid crystal display (LCD) to display various types of information to the user.

A description is given of job data to be used when any one of the MFP 1, MFP 2, MFP 6, PC 3, and PC 7 requests other apparatus to conduct a given processing with reference to FIG. 5A. As shown in FIG. 5A, when one apparatus transmits data to another apparatus to conduct a given processing, such data may include to-be-processed data, an address of process-request-receiving apparatus or receiving apparatus, coordinated information specifying the content of given processing to be conducted at the process-request-receiving apparatus or receiving apparatus, and the user information. These data may be collectively called job data in example embodiments. Hereinafter, the process-request-receiving apparatus may be referred to the receiving apparatus.

FIG. 5A shows an example of job data when requesting an execution of a job from one apparatus to another apparatus, and FIG. 5A shows job data including user information. The user information may include, for example, user name, authentication method, user identification (ID), login name, password, login date, login apparatus, and access limitation information.

The user name is used as identification information of user (e.g., User Q) to identify a user of apparatus.

The authentication method is identification information of authentication server (e.g., first authentication server) used for the user authentication of an apparatus that the user is to use or uses.

The user ID (e.g., 123456) is information input to an apparatus by a user when the user is to use or uses an apparatus, and the authentication server can verify the user verification success if the input user ID information is the correct ID. The login name (e.g., q_xxxx) is a name of user to be input when to login an apparatus. The password (e.g., q_yyyy) is a password of user to be input when to login an apparatus. The user ID, login name, and password used for the user authentication of apparatus that the user is to use or uses can be registered in the authentication server in advance.

The login date (e.g., 2010.09.xx) is information of date and/or time when a user logins an apparatus. The login apparatus (e.g., MFP A) is identification information of an apparatus that a user conducts a login process.

The access limitation information includes information which function of the login apparatus is allowed to be used by a user, wherein such information can be varied for each one of users. Therefore, the access limitation information can be referred to as "use-allowable function information." For example, in an example case of FIG. 5A, a user is allowed to use the copying and facsimile communication functions of apparatus, but not allowed to use the printing function of apparatus.

The job data shown in FIG. 5A and to-be-processed data can be transmitted from one apparatus such as MFP 1, MFP 2, PC 3, MFP 6, or PC 7 to other apparatus, to be used as a receiving apparatus, as job data when one apparatus requests other apparatus to conduct a given processing for the to-be-processed data.

The job data shown in FIG. 5A can be modified to different job data as shown in FIG. 5B. The job data of FIG. 5B includes some of the data shown in FIG. 5A while not including some other data such as user ID, login name, and password. The exact configuration of the job data of FIG. 5B may be prepared in view of information security requirements, because the user ID, login name, and password are closely related to the security of the information processing system. For example, when job data is transmitted from one apparatus to another apparatus via a network, such job data may be accidentally obtained by an unauthorized person. However, if the job data of FIG. 5B is used for data transmission, the unauthorized person does not obtain the user ID, login name, and password from the obtained job data, thus enhancing information security. As can be appreciated by those skilled in the art, the job data shown in FIGS. 5A and 5B can be selectively used as required.

A description is given of coordinated processing conductable by the information processing system of FIG. 1. The term "coordinated processing" is a process of combining the capabilities of the apparatuses connected to each other via one or more networks. For example, when the user Q uses the MFP 1 not having the facsimile communication function, a facsimile transmission cannot be conducted directly from the MFP 1. In such a situation, the MFP 1 can transfer facsimile data to the MFP 2 having the facsimile communication function and connected on the same network of the MFP 1, or the MFP 6 having the facsimile communication function and connected on another network, which is different from the network of the MFP 1. Such MFPs 2 or 6 can be instructed to conduct the facsimile transmission for the MFP 1. Such coordinated processing can be conducted using coordinated information composed of a plurality of different processes when conducting a given job. For example, when an optical character reading (OCR) process is conducted, a plurality of processes such as extracting text data, storing the extracted text data and log data, and storing only the extracted text data in a server may be conducted. Such plurality of processes may be prepared as the coordinated information. Such coordinated information can be prepared for various types of processing.

When the coordinated processing using a plurality of apparatuses is to be conducted, a process-request receiving apparatus such as MFP 2 or MFP 6 can automatically conduct the user authentication at the MFP 2 or MFP 6 based on the user information transmitted from the MFP 1. FIG. 6 is an example table showing a relationship of authentication method between process requester apparatus or requesting apparatuses and process-request-receiving apparatus or receiving apparatus in the information processing system of FIG. 1. Hereinafter, the process requester apparatus may be referred to the requesting apparatus.

The table of FIG. 6 shows a case that a requesting apparatus such as MFP 1 and a receiving apparatus such as MFP 2 use the same authentication server such as the first authentication server 4. Specifically, the MFP 1 uses the first authentication server 4 as the authentication method of user authentication, and the MFP 2 also uses the first authentication server 4 as the authentication method of user authentication. Therefore, when the user Q is verified as the verified user of the MFP 1 by conducting the user authentication for the MFP 1, the user Q can be automatically verified as the verified user of the MFP 2, and thereby the MFP 2 can automatically allow the user Q to use the MFP 2.

If the MFP 1 and MFP 2 use the same authentication server such as the first authentication server 4 for the user authentication, and when the user Q requests the user authentication or verification at the MFP 1 and the user Q is verified as the verified user for the MFP 1, the user Q can be surely verified as the verified user for the MFP 2.

Therefore, if the user Q is verified as the verified user for the MFP 1, it is assumed that the user Q is verified as the verified user for the MFP 2, which means the user authentication process at the MFP 2 can be omitted. Therefore, when the user Q instructs or requests a coordinated processing from the MFP 1 to the MFP 2, the coordinated processing can be executed without conducting the user authentication process at the MFP 2, by which user's convenience can be enhanced.

In contrast, there is a case that a requesting apparatus such as MFP 1 and a receiving apparatus such as MFP 6 use different authentication servers. Specifically, if the MFP 1 uses the first authentication server 4 as the authentication method of user authentication, and the MFP 6 uses the second authentication server 8 as the authentication method of user authentication, even if the user Q is verified as the verified user for the MFP 1, the MFP 6 does not allow the user Q to use the MFP 6 because the authentication method of the MFP 6 is different from the authentication method of the MFP 1.

Because the MFP 6 conducts the user authentication process using the second authentication server 8 different from the first authentication server 4 used by the MFP 1, it is not confirmed yet whether the user Q is registered in the second authentication server 8 even if the user Q is registered in the first authentication server 4. Therefore, the MFP 6 does not omit the user authentication process with a concern of system security.

Figure 7:
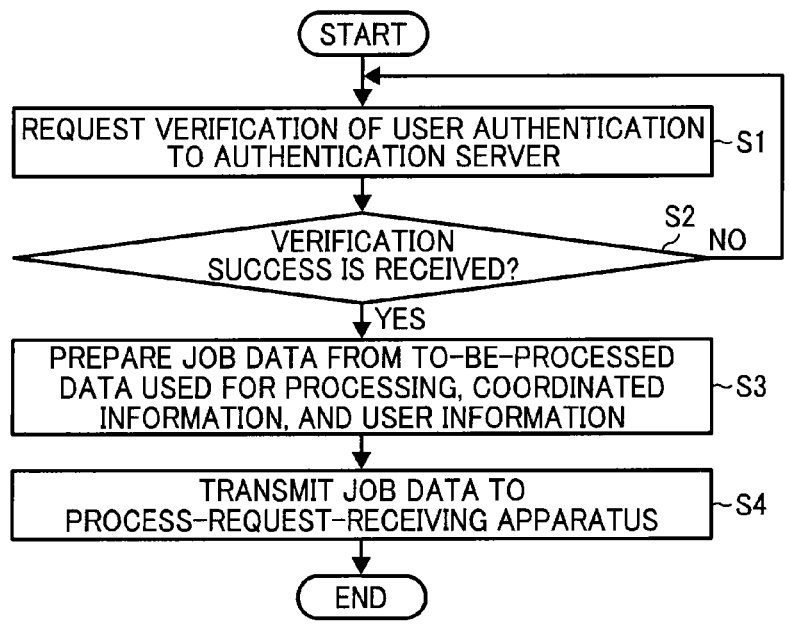
FIG. 7 is a flow chart of a process executed by a MFP used as a requesting apparatus.

A description is given of a coordinated processing for a facsimile transmission processing using the MFP 1 and another MFP such as MFP 2 or MFP 6, in which the MFP 1 requests the MFP 2 or MFP 6 to conduct the facsimile transmission. FIG. 7 is a flow chart of a process executed by the MFP 1 when used as a process requester apparatus or requesting apparatus. In this disclosure, the requesting apparatus means an apparatus that requests other apparatus to conduct a given processing, and the process-request-receiving apparatus or receiving apparatus means an apparatus that receives such request and conducts such requested processing if the required recondition is satisfied.

When the MFP 1 requests a facsimile transmission processing to the MFP 2 or MFP 6, the facsimile transmission processing can be conducted by conducting the process shown in FIG. 7 at first. At step S1, the verification unit 19 of the MFP 1 (FIG. 2) transmits the user information such as login name and password, input by the user Q to the MFP 1, to the first authentication server 4, and requests the verification of user authentication to the first authentication server 4.

At step S2, it is determined whether the user verification success report is received from the first authentication server 4. If the user verification failure report is received from the first authentication server 4 by the MFP 1 (step S2: No), the process returns to step S1, and another verification request is transmitted to the authentication server 4 by inputting the user information again.

In contrast, if the user verification success report is received (step S2: Yes) from the first authentication server 4 by the MFP 1, at step S3, the processing unit 20 of MFP 1 (FIG. 2) prepares job data based on to-be-processed data, coordinated information, and the user information (preparing of job data). For example, facsimile transmission data, coordinated information used for executing the facsimile transmission processing by using the MFP 2 or MFP 6, and the user information are prepared as job data as shown in FIGS. 5A and 5B.

At step S4, the communication control unit 17 of MFP 1 transmits the job data to the MFP 2 or MFP 6 used as the receiving apparatus, wherein information of the transmission destination apparatus (i.e., process-request-receiving apparatus or receiving apparatus) can be included in the coordinated information, and then the process ends.

The user information may include, for example, a name of first authentication server 4, a user ID and user login name/password, a name of user, and use-allowable function information. The name of first authentication server 4 is identification information of the first authentication server 4, which is used by the MFP 1 for user authentication of the user Q. The user ID and user login name/password are used for the user authentication process at the first authentication server 4. The name of user (e.g., User Q in FIG. 5A) is user identification information to identify the user of the MFP 1. The use-allowable function information indicates which function of the MFP 1 is allowed to be used by the user Q (e.g., copying and facsimile communication functions are allowed, and printing function is not allowed as shown in FIG. 5A).

Figure 8:
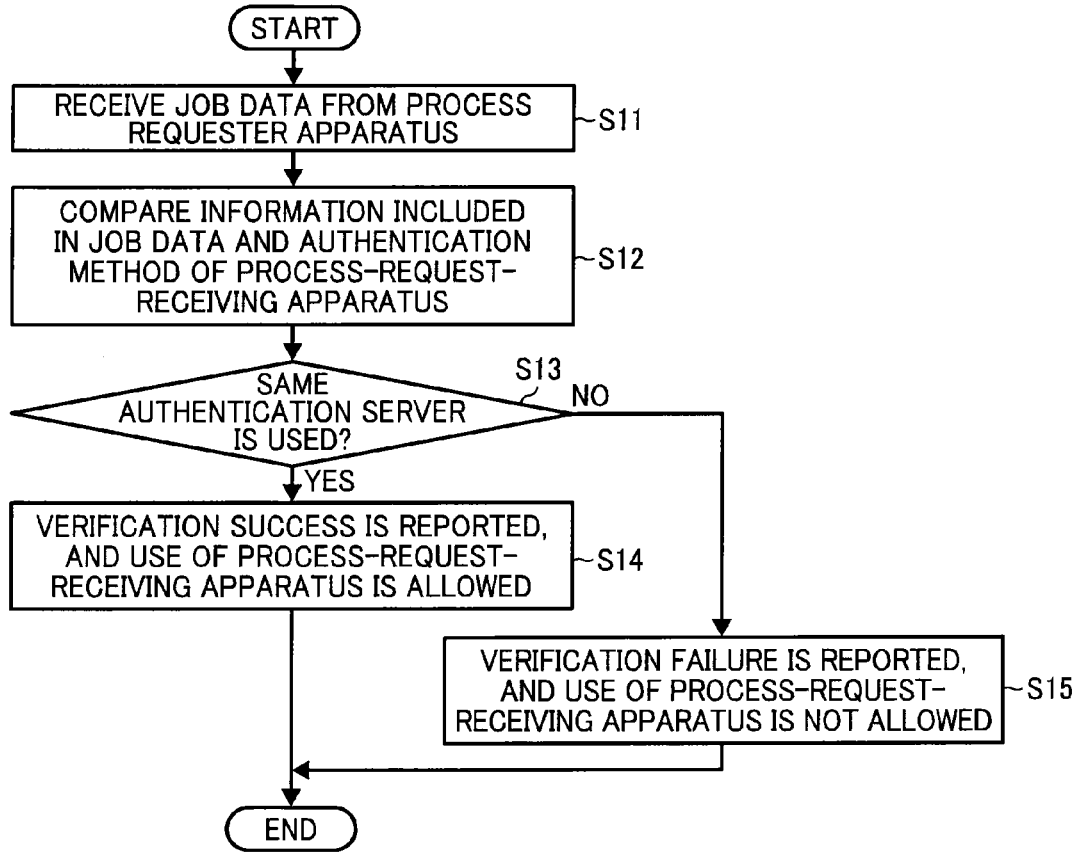
FIG. 8 is a flow chart of a process executed by a MFP used as a receiving apparatus.

FIG. 8 is a flow chart of a process executed by the MFP 2 and 6 when used as the process-request-receiving apparatus or receiving apparatus according to an example embodiment. At step S11, the communication control unit 17 of the MFP 2 or MFP 6 used as the receiving apparatus receives the job data from the MFP 1 used as the process requester apparatus or requesting apparatus.

At step S12, the verification unit 19 of the MFP 2 or MFP 6 compares the information included in the job data and the authentication method of the receiving apparatus. For example, the authentication method used for the MFP 1 (i.e., first authentication server 4) and the authentication method used for the MFP 2 (i.e., first authentication server 4) are compared, or the authentication method used for the MFP 1 (i.e., first authentication server 4) and the authentication method used for the MFP 6 (i.e., second authentication server 8) are compared.

At step S13, the verification unit 19 of the MFP 2 or MFP 6 determines whether the requesting apparatus and the receiving apparatus use the same authentication server as the authentication apparatus.

If the receiving apparatus is the MFP 2, it is determined that the same authentication server is used (step S13: Yes) based on a comparison result, which may be referred as comparison. Then, at step S14, the user verification success is reported, and the use of receiving apparatus such as MFP 2 is allowed for the user Q to conduct the requested process, wherein the user Q that uses the MFP 1 is already verified as the authentic or verified user of the MFP 1, and then the process ends.

With such a configuration, while the user access limitation is effectively set for each of the apparatuses, the burden of user-initiated authentication process when conducting a given processing by coordinating or linking a plurality of information processing apparatuses can be reduced.

In contrast, if the receiving apparatus is the MFP 6, it is determined that the same authentication server is not used (step S13: No) based on a comparison. Then, at step S15, the user verification failure is reported, and the use of receiving apparatus such as MFP 6 is not allowed for the user Q to conduct the requested process, which is requested by the user Q that uses the MFP 1, and then the process ends. When the user verification has failed (or the use of receiving apparatus is not allowed), the user verification failure and a use-not-allowed situation are preferably reported to the MFP 1. As such, if the MFP 6 uses the authentication method different from the authentication method of the MFP 1, the use of MFP 6 is not allowed in the process corresponding to FIG. 8.

There is another configuration which allows the user Q to use the MFP 6 even if the MFP 6 uses the authentication method different from the authentication method of the MFP 1. In such configuration, the user Q, verified as the verified user of the MFP 1, can be verified as the verified user of MFP 6 by conducting the user authentication process of the user Q for the MFP 6 so that the user Q can be allowed to use the MFP 6. Such configuration is described with reference to FIG. 9.

Figure 9:
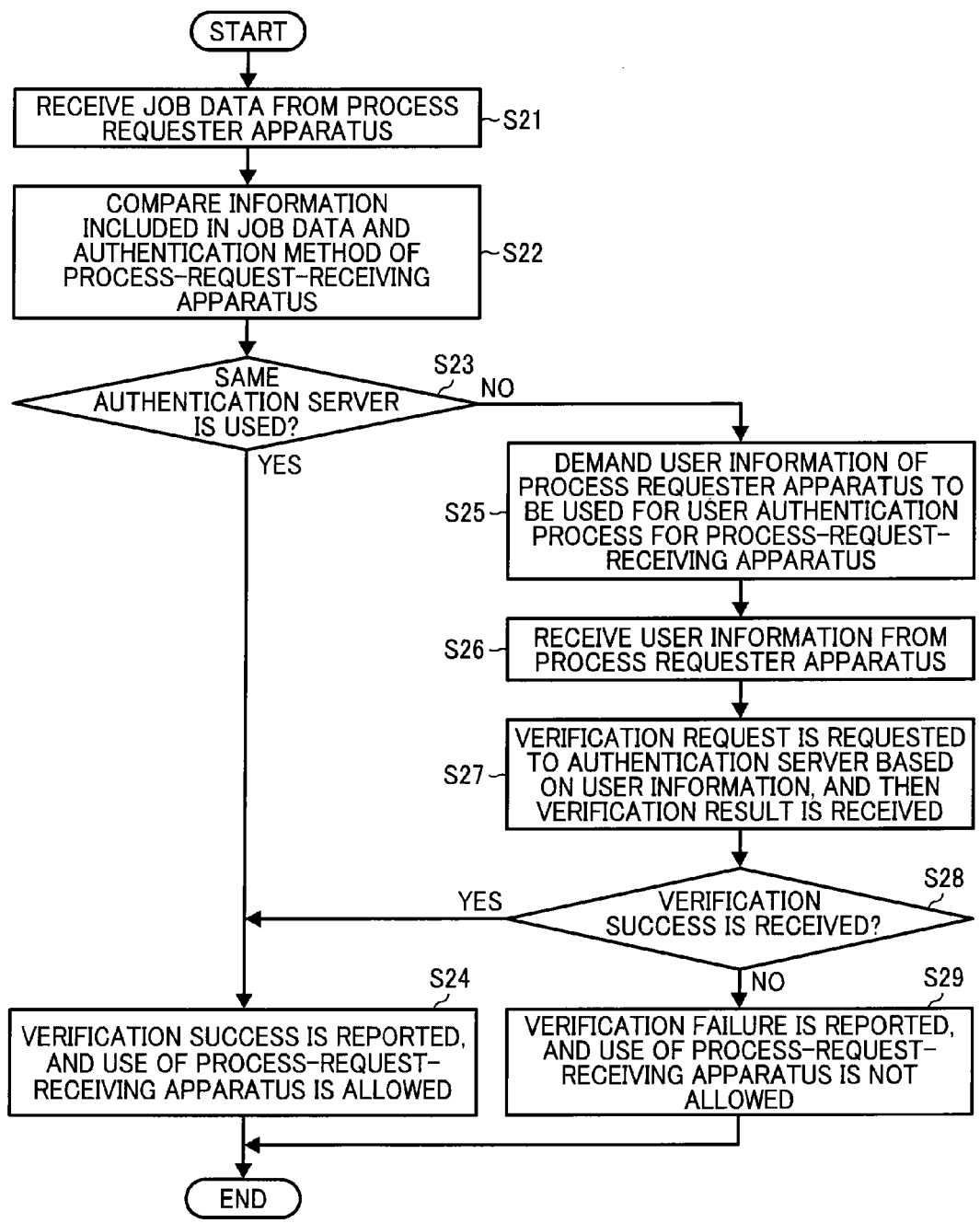
FIG. 9 is a flow chart of another process executed by a MFP used as a receiving apparatus.

FIG. 9 is a flow chart of another process executed by the MFP 2 or MFP 6 according to an example embodiment. At step S21, the communication control unit 17 of the MFP 2 or MFP 6 used as the receiving apparatus receives job data from the MFP 1 used as the requesting apparatus.

At step S22, the verification unit 19 of the MFP 2 or MFP 6 compares the information included in the job data and the authentication method of the receiving apparatus. For example, the authentication method used for the MFP 1 (i.e., first authentication server 4) and the authentication method used for the MFP 2 (i.e., first authentication server 4) are compared, or the authentication method used for the MFP 1 (i.e., first authentication server 4) and the authentication method used for the MFP 6 (i.e., second authentication server 8) are compared.

At step S23, the verification unit 19 of the MFP 2 or MFP 6 determines whether the requesting apparatus and the receiving apparatus use the same authentication server as the authentication apparatus.

If the receiving apparatus is the MFP 2, it is determined that the same authentication server is used (step S23: Yes) based on a comparison. Then, at step S24, the user verification success is reported, and the use of receiving apparatus such as MFP 2 is allowed for the user Q to conduct the requested process, wherein the user Q that uses the MFP 1 is already verified as the authentic or verified user of the MFP 1, and then the process ends.

With such a configuration, while the user access limitation is effectively set for each of the apparatuses, the burden of user-initiated authentication process when conducting a given processing by coordinating or linking a plurality of information processing apparatuses can be reduced.

In contrast, if the receiving apparatus is the MFP 6, it is determined that the same authentication server is not used (step S23: No) based on a comparison, and the process proceeds to step S25. At step S25, the verification unit 19 of MFP 6 (receiving apparatus) demands the user information of MFP 1 to the MFP 1 (requesting apparatus) so that the user information of the MFP 1 is to be used for the user authentication process for the MFP 6. For example, the MFP 6 demands the user information such as login name and password to the MFP 1. Such user information demand may be conducted when the receiving apparatus (e.g., MFP 6) receives given job data shown in FIG. 5B from the requesting apparatus (e.g., MFP 1) at step S21.

At step S26, the verification unit 19 of the MFP 6 receives the user information from the MFP 1 via the communication control unit 17 of the MFP 6, in which the MFP 6 receives the user information such as login name and password of the user Q that uses the MFP 1.

At step S27, a verification request is requested to the authentication server based on the user information, and then a verification result is received. Specifically, the user information such as login name and password of the user Q received from the MFP 1 is transmitted to the second authentication server 8 via the MFP 6 to request the user verification and to receive the verification result.

At step S28, the verification unit 19 of the MFP 6 determines whether the user verification success is confirmed for the user authentication process. If a verification result received from the second authentication server 8 is the user verification success, it is determined that the verification has succeeded (step S28: Yes), then the process proceeds to step S24, in which the user Q of the MFP 1 is verified as the authentic or verified user of the MFP 6, the user Q is allowed to use the MFP 6, and the requested process can be conducted using the MFP 6. Then, the process ends.

With such a configuration, even if the MFP 1 and MFP 6 use different authentication methods, the user authentication of the user Q for the MFP 6 can be verified via the MFP 1 without a direct operation by the user Q at the MFP 6 if the user Q has an account storing the user information of the user Q in the second authentication server 8, and then the user Q can use the MFP 6, and thereby user's convenience can be further enhanced. The authentication server may store user information of users as account information of users.

In contrast, if the verification unit 19 of the MFP 6 receives the user verification failure from the second authentication server 8 as the verification result (step S28: No), it is determined that user verification has failed. Then, at step S29, the user verification failure is reported, and the user Q is not allowed to use the receiving apparatus such as MFP 6, which means the process requested by the user Q that uses the MFP 1 is not conducted, and the process ends. When the user verification has failed (or the use of receiving apparatus is not allowed), the user verification failure and a use-not-allowed situation are preferably reported to the MFP 1. In such user authentication process of the MFP 6 corresponding to FIG. 9, the user information is demanded from the MFP 6 to the MFP 1, and the user information such as login name and password verified at the MFP 1 is received by the MFP 6 from the MFP 1.

Further, there is another configuration that does not require the user information demand step, in which the MFP 6 does not demand the user information to the MFP 1, but the MFP 6 can use the user information received from the MFP 1 when the user authentication is to be conducted at the MFP 6 for the user Q of the MFP 1, in which the MFP 6 receives the job data of FIG. 5A that includes the user information. If the concerned user information is registered in the second authentication server 8 in advance, the concerned user can be verified as the verified user of the concerned apparatus. Such configuration is described with reference to FIG. 10A, in which the user information of the MFP 1 may be registered in the second authentication server 8 in advance.

Figure 10A:
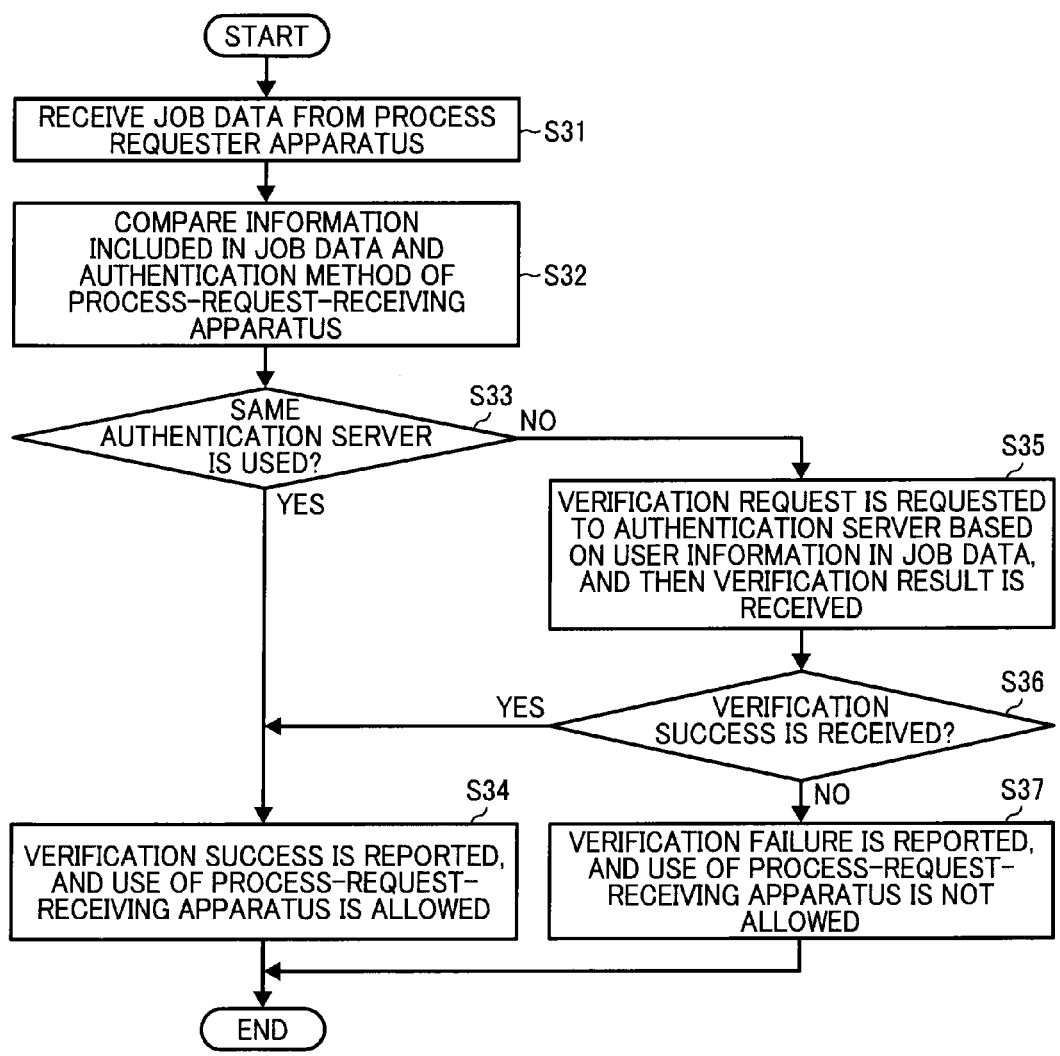
FIG. 10A is a flow chart of still another process executed by a MFP, used as a receiving apparatus.

FIG. 10A is a flow chart of still another process executed by the MFP 2 or MFP 6 according to an example embodiment. At step S31, the communication control unit 17 of the MFP 2 or MFP 6 used as the receiving apparatus receives job data from the MFP 1 used as the requesting apparatus.

At step S32, the verification unit 19 of the MFP 2 or MFP 6 compares the information included in the job data and the authentication method of the receiving apparatus. For example, the authentication method used for the MFP 1 (i.e., first authentication server 4) and the authentication method used for the MFP 2 (i.e., first authentication server 4) are compared, or the authentication method used for the MFP 1 (i.e., first authentication server 4) and the authentication method used for the MFP 6 (i.e., second authentication server 8) are compared.

At step S33, the verification unit 19 of the MFP 2 or MFP 6 determines whether the requesting apparatus and the receiving apparatus use the same authentication server as the authentication apparatus.

If the receiving apparatus is the MFP 2, it is determined that the same authentication server is used (step S33: Yes) based on a comparison. Then, at step S34, the user verification success is reported, and the use of receiving apparatus such as MFP 2 is allowed for the user Q to conduct the requested process, wherein the user Q that uses the MFP 1 is already verified as the authentic or verified user of the MFP 1, and then the process ends.

With such a configuration, while the user access limitation is effectively set for each of the apparatuses, the burden of user-initiated authentication process when conducting a given processing by coordinating or linking a plurality of information processing apparatuses can be reduced.

In contrast, if the receiving apparatus is the MFP 6, it is determined that the same authentication server is not used (step S33: No) based on a comparison.

At step S35, the verification unit 19 requests a verification request to the authentication server of the MFP 6 based on the user information included in the job data, and then a verification result is received at the MFP 6. Specifically, the user information such as login name and password of the user Q received from the MFP 1 is transmitted to the second authentication server 8 via the MFP 6 to request the user verification and to receive the verification result at the MFP 6. Specifically, the user information such as login name and password of the user Q received from the MFP 1 with the job data is transmitted to the second authentication server 8 to request the user verification and to receive a verification result at the MFP 6.

At step S36, the verification unit 19 of the MFP 6 determines whether the user verification success is confirmed for the user authentication process.

If the verification result received from the second authentication server 8 is the user verification success, it is determined that the verification has succeeded (step S36: Yes), then the process proceeds to step S34, in which the user Q of the MFP 1 is verified as the authentic or verified user of the MFP 6 and the user Q is allowed to use the MFP 6, and the requested process can be conducted using the MFP 6. Then, the process ends.

In contrast, if the verification unit 19 of the MFP 6 receives the user verification failure from the second authentication server 8 as the verification result (step S36: No), it is determined that user verification has failed. Then, at step S37, the user verification failure is reported, and the user Q is not allowed to use the receiving apparatus such as MFP 6 for conducting the requested process requested by the user Q that uses the MFP 1, and the process ends. When the verification has failed (or the use of receiving apparatus is not allowed), the user verification failure and a use-not-allowed situation are preferably reported to the MFP 1.

In the process of FIG. 10A, if the verification unit 19 of the MFP 6 receives the user verification failure from the second authentication server 8 as the verification result (step S36: No), it is determined that user verification has failed, resultantly, the user Q is not allowed to use the receiving apparatus such as MFP 6 for conducting the requested process, and the process ends. However, such non-conducting of requested process may be not be preferable in some situations if the requested process needs to be conducted urgently for some reason, such as an imminent a document submission deadline.

Figure 10B:
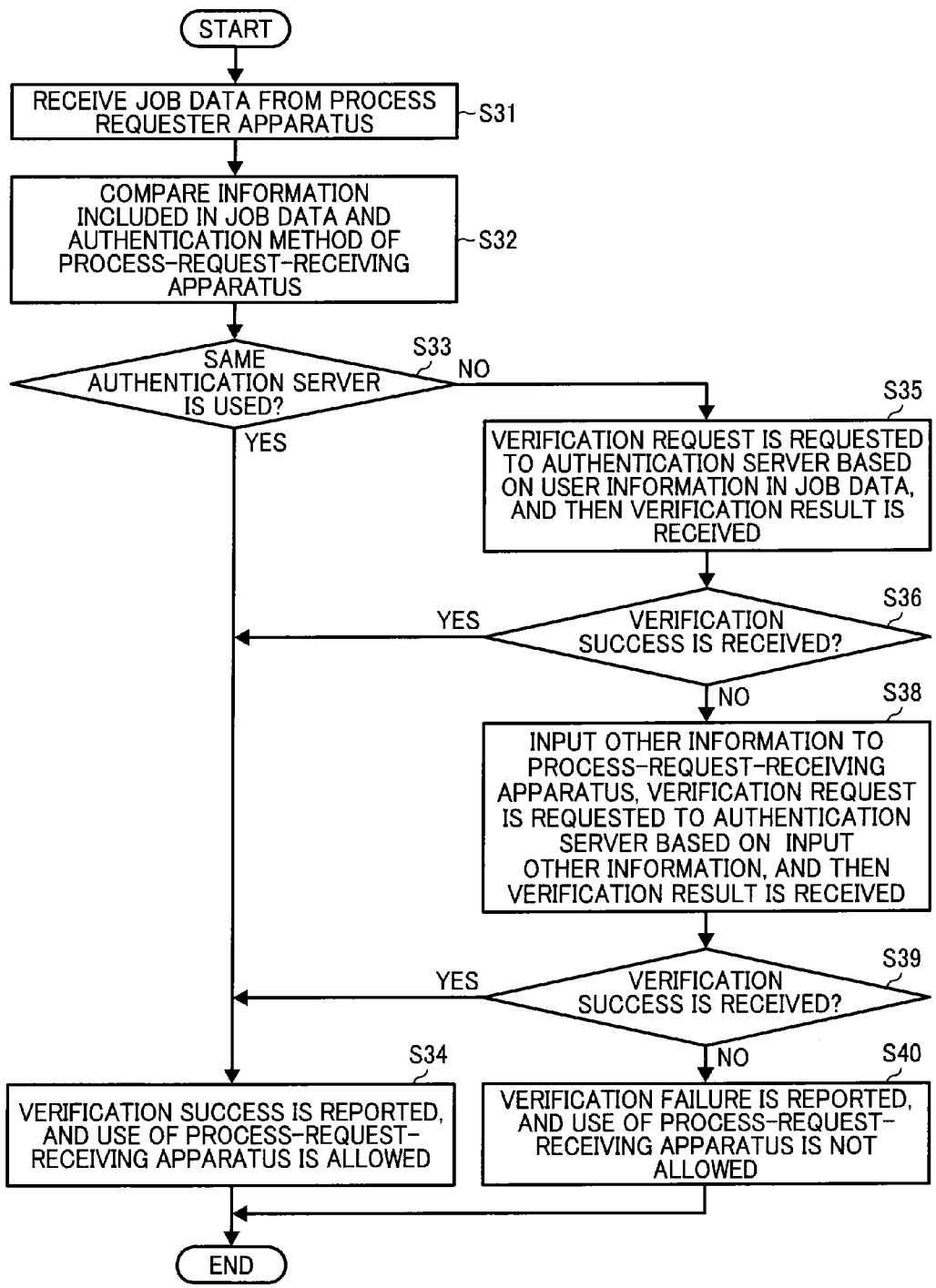
FIG. 10B is a flow chart of still another process executed by a MFP used as a receiving apparatus.

FIG. 10B shows another process that the requested process can be conducted even if the verification result at step S36 of FIG. 10A is the user verification failure. The steps shown in FIG. 10B are similar to the steps shown in FIG. 10A except steps S38, S39, and S40.

If the verification unit 19 of the MFP 6 receives the user verification failure from the second authentication server 8 as the verification result (step S36: No), it is determined that user verification has failed.

Then, at step S38 of FIG. 10B, another verification process can be conducted. Until the process proceeds to step S36, the user information of user Q using the MFP 1 is used. When the user verification failure is confirmed (step S36: No), such user information of user Q cannot be used to activate the concerned function at the MFP 6. In view of such situation, step S38 is conducted as follows.

At step 38, the user Q can use other information for user verification at the MFP 6 instead of the user information used until the process proceeds to step S36. Specifically, such other information may be, for example, a section code of a section that the user Q belongs, in which the section may be research and development (R/D) department, sales department, or the like. The other information is not limited to the section code but can be set to any information as required.

At step S38, the user Q can input such section code to the MFP 6. For example, the user Q can input the section code to the MFP 6 by manually operating an operation panel or a control panel of the MFP 6 or placing a security card storing the section code over the MFP 6, but not limited thereto. Further, the user Q can input such section code to the MFP 6 from a remote position such as a PC that the user Q uses, in which an information inputting screen can be displayed on a display of the PC, and the user Q can input the section code using the information inputting screen.

At step S38, a verification request is requested to the second authentication server 8 of the MFP 6 based on the other information such as section code instead of the user information of user Q. Specifically, the section code information is transmitted to the second authentication server 8 from the MFP 6 to request the user verification and to receive the verification result at the MFP 6.

At step S39, a verification result is received at the MFP 6 from the second authentication server 8. If the verification result received from the second authentication server 8 is the user verification success, it is determined that the verification has succeeded (step S39: Yes), then the process proceeds to step S34, the user Q is allowed to use the MFP 6, and the requested process can be conducted using the MFP 6. Then, the process ends.

In contrast, if the verification unit 19 of the MFP 6 receives the user verification failure from the second authentication server 8 as the verification result (step S39: No), it is determined that user verification has failed. Then, at step S40, the user verification failure is reported to the MFP 1, and the user Q is not allowed to use the receiving apparatus such as MFP 6 for conducting the requested process requested by the user Q that uses the MFP 1, and the process ends. When the verification has failed (or the use of receiving apparatus is not allowed), the user verification failure and a use-not-allowed situation are preferably reported to the MFP 1.

As such, in the process of FIG. 10B, even if the user information of the concerned user such as user Q cannot be used to activate the concerned function of the receiving apparatus, other information such as section code can be used to activate the concerned function of the receiving apparatus, by which the user convenience can be enhanced while maintaining the security level of the information processing system at a preferable level. As such, different types of information can be used to activate the concerned function of the receiving apparatus in the process of FIG. 10B.

As such, even if is determined that the user Q is not allowed to use the receiving apparatus such as MFP 2 or MFP 6 at first, the process requested from the MFP 1 can be executed using the MFP 2 or MFP 6 by selectively conducting the above described processes.

When it is confirmed that the receiving apparatus such as MFP 2 or MFP 6 can be used for executing the requested process, the user access limitation for functions of the MFP 2 or MFP 6 needs to be checked for each user to determine whether each user is allowed to use a concerned function at the MFP 2 or MFP 6. Such function checking process is described with reference to FIG. 11.

Figure 11:
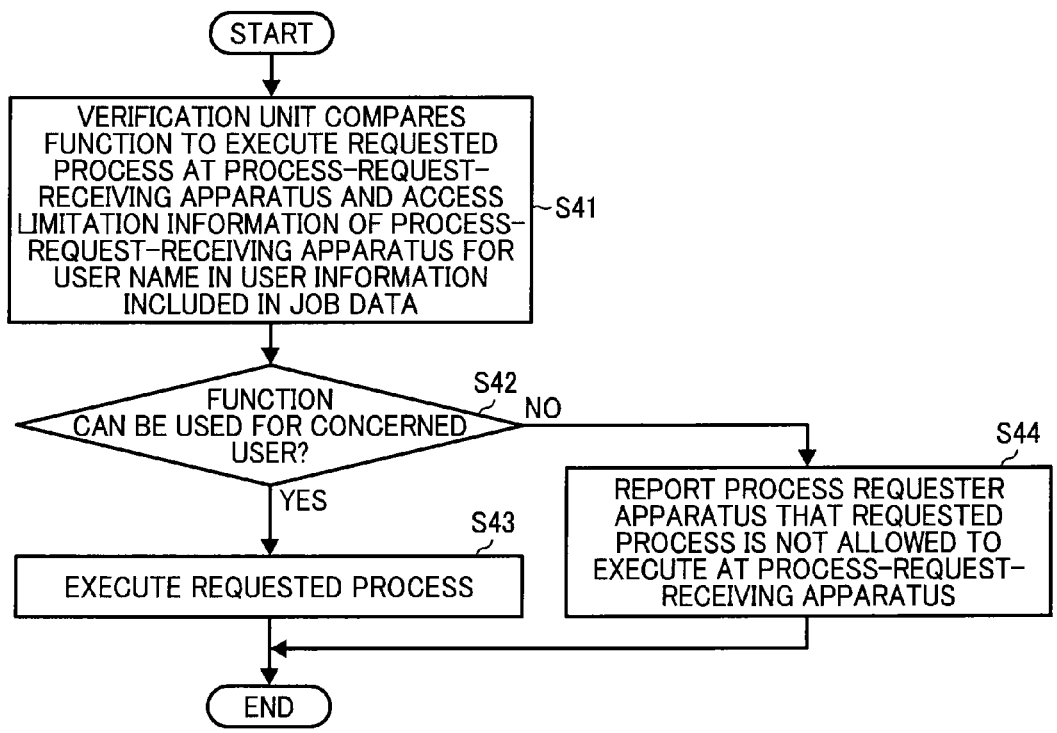
FIG. 11 is a flow chart of a process executed after allowing use of MFP used as a receiving apparatus.

FIG. 11 is a flow chart of a process executed after allowing the use of MFP 2 or MFP 6 used as the receiving apparatus. At step S41, the verification unit 19 of MFP 2 or MFP 6 compares a function to execute a process requested to the MFP 2 or MFP 6 specified in the coordinated information, and the access limitation information, set to the MFP 2 or MFP 6 for a user name specified in the user information included in the job data. For example, the verification unit 19 of the MFP 2 or MFP 6 compares a facsimile communication function to execute the facsimile transmission processing, requested to the MFP 2 or MFP 6 from the MFP 1, and the access limitation information set for each user and stored in the storage unit 11 of the MFP 2 or MFP 6, for the user name (e.g., user Q) received from the MFP 1.

At step S42, the verification unit 19 of the MFP 2 or MFP 6 determines whether the function of the MFP 2 or MFP 6 can be used for the concerned user. For example, the verification unit 19 of the MFP 2 or MFP 6 determines whether the facsimile transmission function of the MFP 2 or MFP 6 to execute the facsimile transmission processing is allowed to be used by the user Q that uses the MFP 1.

If it is determined that the facsimile transmission function of the MFP 2 or MFP 6 is allowed to be used by the user Q (step S42: Yes), at step S43, the requested process is executed, in which the MFP 2 or MFP 6 executes the facsimile transmission processing requested from the MFP 1, and reports the process result of the facsimile transmission processing to the MFP 1, and then the process ends.

In the above example case, the coordinated processing for facsimile transmission processing using the MFP 1 and the MFP 2 or MFP 6 is described. Further, by coordinating a plurality of MFPs, a plurality of PCs, or a plurality of apparatuses including MFP and/or PC, a given processing can be executed by conducting the above-described user authentication process.

In contrast, if it is determined that the facsimile transmission function of the MFP 2 or MFP 6 is not allowed to be used by the user Q (step S42: No), at step S44, the MFP 1 is reported that the requested facsimile transmission processing requested by the MFP 1 is not allowed to execute at the MFP 2 or MFP 6. As such, by transmitting the process result that the requested process is not allowed to execute, the process ends.

As such, when the coordinated processing is conducted, an execution of requested process using a receiving apparatus such as MFP 2 or MFP 6 is allowed only when the user Q has an access right to the function of the receiving apparatus such as MFP 2 or MFP 6 that can execute the requested process. With such a configuration, the access security of information processing apparatus such as MFP and PC disposed on a system can be maintained at a preferable level.

In the process corresponding to FIG. 11, the function of the MFP 2 or MFP 6 to execute a process requested by the MFP 1 is allowed to be used by the user Q if the user Q has the access right to the function of the MFP 2 or MFP 6.

Further, in another configuration, if the user Q has the access right to a given function of the MFP 1, the user Q can use the same given function at the MFP 2 or MFP 6 even if the access right of the user Q for the given function at the MFP 2 or MFP 6 is not registered. Such configuration is described with reference to FIG. 12.

Figure 12:
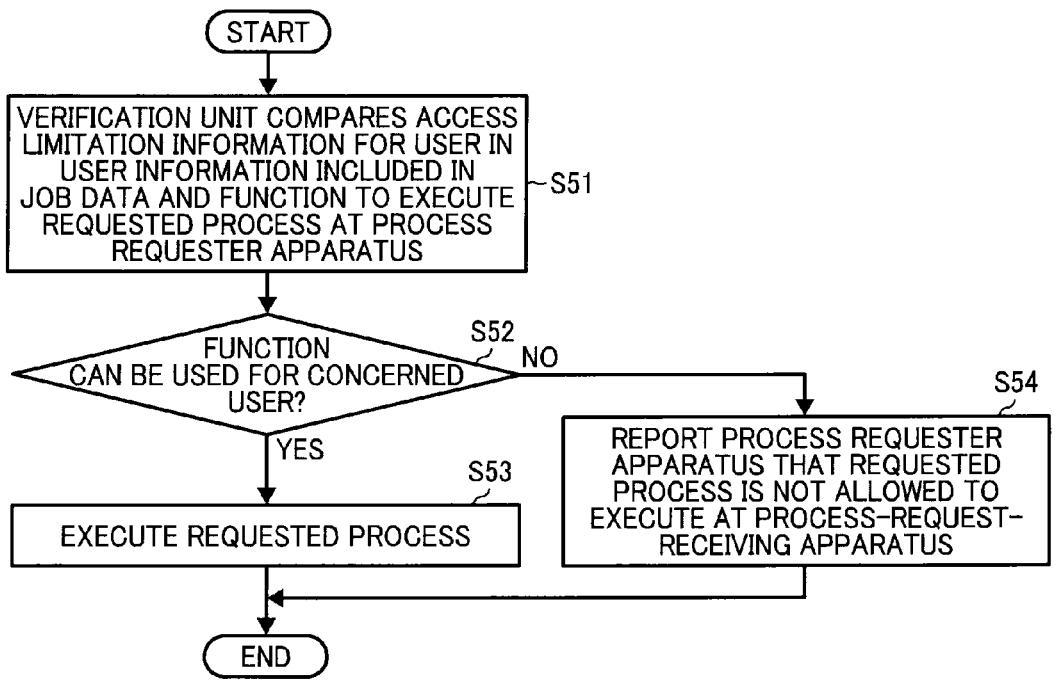
FIG. 12 is a flow chart of another process executed after allowing use of MFP used as a receiving apparatus.

FIG. 12 is a flow chart of another process executed after allowing the use of MFP 2 or MFP 6 used as a receiving apparatus according to another example embodiment.

At step S51, the verification unit 19 of the MFP 2 or MFP 6 compares the access limitation information for the user name specified in the user information included in the job data, received from the MFP 1 (requesting apparatus), and a concerned function to execute the requested process at the MFP 2 or MFP 6, wherein such requested process can be received by the MFP 2 or MFP 6 from the MFP 1 with the coordinated information. For example, the verification unit 19 of the MFP 2 or MFP 6 compares the access limitation information received from the MFP 1 and the facsimile transmission function, which is required to execute of facsimile transmission processing requested by the MFP 1.

At step S52, the verification unit 19 of the MFP 2 or MFP 6 determines whether the function of the MFP 2 or MFP 6 can be used for the concerned user. For example, the verification unit 19 of the MFP 2 or MFP 6 determines whether the facsimile transmission function of the MFP 2 or MFP 6 to execute the facsimile transmission processing requested by the MFP 1 is allowed to be used at the MFP 1 for the user Q.

If it is determined that the facsimile transmission function is allowed to be used at the MFP 1 for the user Q (step S52: Yes), at step S53, the facsimile transmission processing (i.e., requested process) is executed at the MFP 2 or MFP 6. As such, the MFP 2 or MFP 6 can execute the facsimile transmission processing requested from the MFP 1, and report the process result of the facsimile transmission processing to the MFP 1, and then the process ends.

In the above example case, the coordinated processing for facsimile transmission processing using the MFP 1 and the MFP 2 or MFP 6 is described. Further, by coordinating a plurality of MFPs, a plurality of PCs, or a plurality of apparatuses including MFP and/or PC, a given processing can be executed by conducting the above-described user authentication process.

In contrast, if it is determined that the facsimile transmission function is not allowed to be used at the MFP 1 for the user Q (step S52: No), at step S54, the MFP 1 is reported that the requested facsimile transmission processing requested by the MFP 1 is not allowed to execute at the MFP 2 or MFP 6. As such, by transmitting the process result that the requested process is not allowed to execute, the process ends.

As such, when the coordinated processing is conducted, even if the user Q has no access right to the concerned function at the MFP 2 or MFP 6, an execution of requested process using a receiving apparatus such as MFP 2 or MFP 6 is allowed for the user Q when the user Q has an access right to the concerned function at the requesting apparatus such as MFP 1. Such a configuration may be used when the requested process has a priority over the access right limitation such as when a user needs to conduct the requested process urgently. With such a configuration, the access security of information processing apparatus such as MFP and PC disposed on a system can be maintained at a preferable level.

In the above described example embodiments, the user Q can be allowed to use the function of the MFP 2 or MFP 6 to execute the process requested by the MFP 1 if the user Q has the access right to the function of the MFP 2 or MFP 6 as described with FIGS. 8, 9, 10A, 10B, and 11.

Further, in the process corresponding to FIG. 12, the user Q can be allowed to use the function of the MFP 2 or MFP 6 to execute the process requested by the MFP 1 if the user Q has the access right to the concerned function of the MFP 1 used as the requesting apparatus, in which the MFP 2 or MFP 6 can be used to execute the requested process without setting or registering the access right of the user Q at the MFP 2 or MFP 6.

Further, in another configuration, a user can be allowed to use the concerned function for executing the requested process only when the access right of user is set both at a requesting apparatus and a receiving apparatus. Such configuration is described with reference to FIG. 13.

Figure 13:
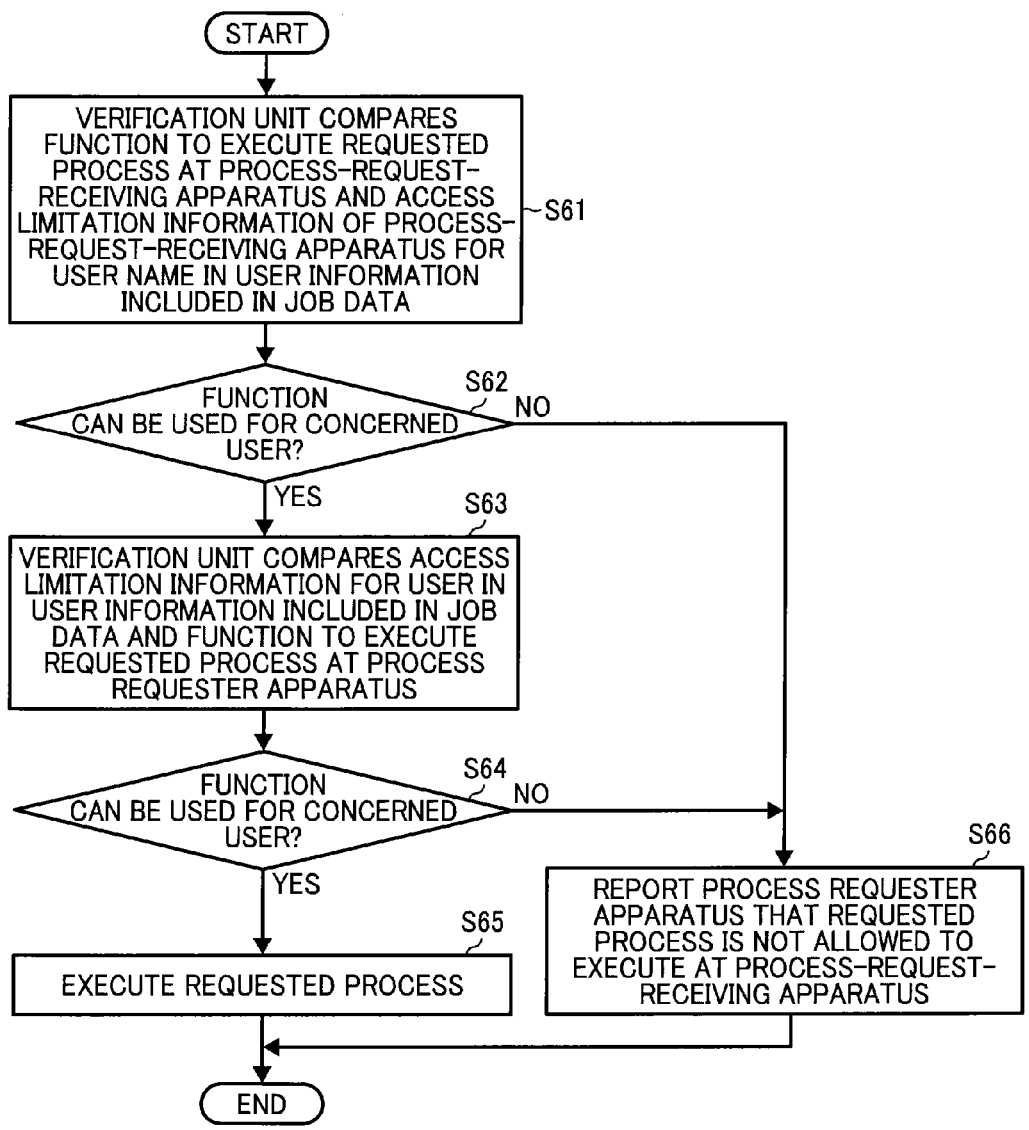
FIG. 13 is a flow chart of still another process executed after allowing use of MFP used as a receiving apparatus.

FIG. 13 is a flow chart of still another process executed after allowing the use of MFP 2 or MFP 6 as a receiving apparatus.

At step S61, the verification unit 19 of the MFP 2 or MFP 6 compares a function to execute a process requested to the MFP 2 or MFP 6 specified by the coordinated information, and the access limitation information set to the MFP 2 or MFP 6 for a user name specified in the user information included in the job data. For example, the verification unit 19 of the MFP 2 or MFP 6 compares a facsimile communication function to execute a facsimile transmission processing, requested to the MFP 2 or MFP 6 from the MFP 1, and the access limitation information set for each user and stored in the storage unit 11 of the MFP 2 or MFP 6, for the user name (e.g., user Q) received from the MFP 1.

At step S62, the verification unit 19 of the MFP 2 or MFP 6 determines whether the function of the MFP 2 or MFP 6 can be used for the concerned user based on the access limitation information set to the MFP 2 or MFP 6. For example, the verification unit 19 of the MFP 2 or MFP 6 determines whether the facsimile transmission function of the MFP 2 or MFP 6 to execute the facsimile transmission processing is allowed to be used by the user Q that uses the MFP 1.

If it is determined that the facsimile transmission function is allowed to be used at the MFP 2 or MFP 6 for the user Q (step S62: Yes), the process proceeds to step S63.

In contrast, if it is determined that the facsimile transmission function is not allowed to be used at the MFP 2 or MFP 6 for the user Q (step S62: No), the process proceeds to step S66. At step S66, the MFP 1 is reported that the requested facsimile transmission processing requested by the MFP 1 is not allowed to execute at the MFP 2 or MFP 6. As such, by transmitting the process result that the requested process is not allowed to execute, the process ends.

At step S63, the verification unit 19 of the MFP 2 or MFP 6 compares the access limitation information in the user information included in the job data and a function to execute the process requested by the MFP 1, requested with the coordinated information. For example, the verification unit 19 of the MFP 2 or MFP 6 compares the access limitation information of the MFP 1 for the user Q received from the MFP 1, and the facsimile communication function required to execute the facsimile transmission processing requested by the MFP 1.

At step S64, the verification unit 19 of the MFP 2 or MFP 6 determines whether the function of the MFP 2 or MFP 6 can be used at the MFP 1 for the concerned user. For example, the verification unit 19 of the MFP 2 or MFP 6 determines whether the facsimile transmission function of the MFP 2 or MFP 6 to be used for executing the facsimile transmission processing is allowed to be used at the MFP 1 for the user Q.

If it is determined that the facsimile transmission function is allowed to be used at the MFP 1 for the user Q (step S64: Yes), at step S65, the requested process such as the facsimile transmission processing requested from the MFP 1 is executed at the MFP 2 or MFP 6. The process result of the facsimile transmission processing is reported to the MFP 1, and then the process ends.

In the above example case, the coordinated processing for facsimile transmission processing using the MFP 1 and the MFP 2 or MFP 6 is described. Further, by coordinating a plurality of MFPs, a plurality of PCs, or a plurality of apparatuses including MFP and/or PC, a given processing can be executed by conducting the above-described user authentication process.

In contrast, if it is determined that the facsimile transmission function is not allowed to be used at the MFP 1 for the user Q (step S64: No), at step S66, the MFP 1 is reported that the requested facsimile transmission processing requested by the MFP 1 is not allowed to execute at the MFP 2 or MFP 6. As such, by transmitting the process result that the requested process is not allowed to execute, the process ends.

As for the process corresponding to FIG. 13, steps S61 and S62 checks whether the concerned function such as facsimile transmission function can be used or executed at the MFP 2 or MFP 6 for the user Q, and then steps S63 and S64 checks whether the concerned function such as facsimile transmission function can be used or executed at the MFP 1 for the user Q. Such processing order can be changed. For example, steps S63/S64 can be conducted at first, and then steps S61/S62 can be conducted. As such, the processing order of steps S61/S62 and steps S63/S64 can be set from steps S61/S62 to steps S63/S64 or from steps S63/S64 to steps S61/S62.

As such, when the coordinated processing is conducted, an execution of requested process using a receiving apparatus such as MFP 2 or MFP 6 is allowed only when the user Q has an access right to the concerned function at both of the requesting apparatus and the receiving apparatus. With such a configuration, the access security of information processing apparatus such as MFP and PC disposed on a system can be maintained at a preferable level.

Figure 14:
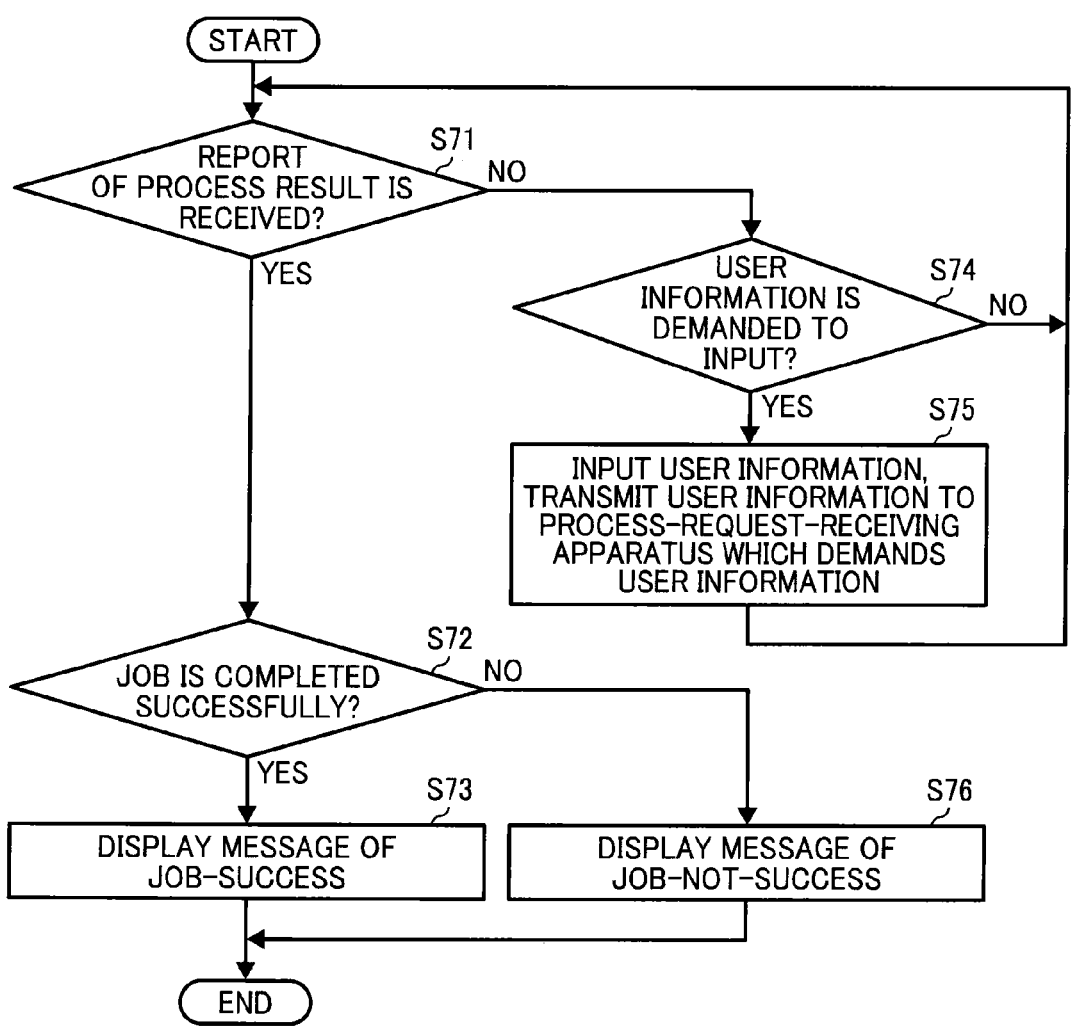
FIG. 14 is a flow chart of a process executed at a MFP used as a requesting apparatus after requesting a process to a MFP used as a receiving apparatus.

A description is given of a process at the MFP 1 after requesting the facsimile transmission processing to the MFP 2 or MFP 6. FIG. 14 is a flow chart of a process at the MFP 1 after requesting a given process to the MFP 2 or MFP 6.

At step S71, the verification unit 19 of the MFP 1 determines whether the communication control unit 17 of the MFP 1 receives a report of process result from the MFP 2 or MFP 6 used as the receiving apparatus. If it is determined that the report of process result is received from the MFP 2 or MFP 6 (step S71: Yes), the process proceeds to step S72. In contrast, if it is determined that the report of process result is not received from the MFP 2 or MFP 6 (step S71: No), the process proceeds to step S74.

At step S74, the verification unit 19 of the MFP 1 determines whether given information is demanded to input to the MFP 2 or MFP 6. For example, it is determined whether the MFP 2 or MFP 6 demands an input of the user information of the MFP 1.

If it is determined that the user information input is not demanded (step S74: No), the process returns to step 71. In contrast, if it is determined that the MFP 2 or MFP 6 demands the user information of the MFP 1 such as the login name and password of the user Q that uses the MFP 1 (step S74: Yes), the process proceeds to step S75.

At step S75, the user Q inputs the login name and password of the user Q, which is used for the user authentication process at the MFP 2 or the MFP 6, and the input login name and password of the user Q are transmitted to the MFP 2 or MFP 6, which demands the user information, and the process returns to step 71.

At step S72, the verification unit 19 of the MFP 1 determines whether the job such as requested process is completed successfully. Specifically, the verification unit 19 of the MFP 1 determines whether the job is completed successfully based on the report of process result received from the MFP 2 or MFP 6.

If the verification unit 19 of the MFP 1 determines that the job is completed successfully (step S72: Yes), at step S73, a message that the job is completed successfully (i.e., job success message) is displayed on the operation/display unit 10 (FIG. 2) using the input/output control unit 15, and then the process ends.

If the verification unit 19 of the MFP 1 determines that the job is not completed successfully (step S72: No), at step S76, a message that the job is not completed successfully (i.e., job failure message) is displayed on the operation/display unit 10 (FIG. 2) using the input/output control unit 15, and then the process ends.

As such, in such configured information processing system, while the user access limitation is effectively set for each of the apparatuses, the burden of user-initiated authentication process, when conducting a given processing by coordinating or linking a plurality of information processing apparatuses, can be reduced.

In the above described example embodiments, a coordinated processing to execute the facsimile transmission processing at the MFP 2 or MFP 6 based on a request from the MFP 1 is explained. However, the coordinated processing using a plurality of MFPs is not limited thereto. For example, in one example of coordinated processing using a plurality of MFPs, the MFP 1 may request the MFP 2 to scan document image as image data, then the MFP 2 transmits the image data to the MFP 6, and then the MFP 6 transmits the image data to other apparatus using a facsimile transmission function of the MFP 6. In this case, the MFP 2 conducts the above described user authentication process with the MFP 1 to allow the use of image scanning function of the MFP 2 for the user of the MFP 1, and then conducts the image scanning process at the MFP 2. Then, the MFP 2 prepares job data from the scanned image data, the user information, and the coordinated information received from the MFP 1, and transmits the job data to the MFP 6. The MFP 6 also conducts the above described user authentication process, and then conducts a given process at the MFP 6.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the workflow system. For example, a particular computer (e.g., personal computer, work station) may control an information processing apparatus such as an image processing apparatus using a computer-readable program, which can execute the above-described processes or steps. Further, in the above-described exemplary embodiments, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to exemplary embodiments, for example.

When the above described information processing system, information processing apparatus, information processing method, and software program are applied, while the user access limitation is effectively set for each of the apparatuses, the burden of user-initiated authentication process when conducting a given processing by coordinating or linking a plurality of information processing apparatuses can be reduced.

The above described information processing system, information processing apparatus, information processing method, and software program according to example embodiments can be applied to various types of information processing apparatuses such as image forming apparatuses used as facsimile machines, printers, scanners, copiers, and multi-functional apparatus, and personal computers, but not limited thereto.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing system comprising:
a first and second plurality of information processing apparatuses, each of the information processing apparatuses including a transmitter and a verification circuit; and
a plurality of authentication servers communicably connected to the first and second plurality of information processing apparatuses via one or more networks, wherein
the first and second plurality of information processing apparatuses and the plurality of authentication servers are grouped into a plurality of groups including at least a first group and a second group,
the first group includes the first plurality of information processing apparatuses and a first authentication server communicably connected to each other, the first authentication server is configured to store user information of one or more users that use the information processing apparatuses in the first group, the first authentication server is configured to authenticate users that use each of the information processing apparatuses in the first group by comparing the stored user information and user information input by a user to any one of the first plurality of information processing apparatuses, and when the stored user information and the input user information input are identical, the first authentication server is configured to issue a user verification success to the information processing apparatus that transmitted the user information to the first authentication server, and the information processing apparatus is configured to allow the user to use the information processing apparatus,
the second group includes the second plurality of information processing apparatuses and a second authentication server connected to each other, the second authentication server is configured to store user information of one or more users that use the information processing apparatuses in the second group, the second authentication server is configured to authenticate users that use each of the information processing apparatuses in the second group by comparing the stored user information and user information input by a user to any one of the second plurality of information processing apparatuses, and when the stored user information and the input user information input are identical, the second authentication server is configured to issue a user verification success to the information processing apparatus that transmitted the user information to the second authentication server, and the information processing apparatus is configured to allow the user to use the information processing apparatus,
when one information processing apparatus requests another information processing apparatus to execute a given processing:
the one information processing apparatus is configured to act as a requesting apparatus and the other information processing apparatus is configured to act as a receiving apparatus,
the requesting apparatus is configured to transmit job data to the receiving apparatus, the job data including an identification information of the authentication server in the group of the requesting apparatus and the execution request of the given processing,
the receiving apparatus is configured to receive the job data including the identification information,
the verification circuit of the receiving apparatus is configured to compare the received identification information with identification information of the authentication server that the receiving apparatus uses for user authentication, and
when the verification circuit of the receiving apparatus determines that the received identification information is identical to the identification information of the authentication server that the receiving apparatus uses for user authentication, the receiving apparatus is configured to allow the requesting apparatus to use the receiving apparatus to execute the requested given processing.

2. The information processing system of claim 1, wherein when the verification circuit of the receiving apparatus determines that the authentication server of the receiving apparatus and the authentication server of the requesting apparatus are not identical,
the receiving apparatus is configured to demand user information from the requesting apparatus, receive the user information from the requesting apparatus, and transmit the user information to the authentication server,
the authentication server used by the receiving apparatus is configured to conduct the user authentication based on the user information received from the requesting apparatus, and
the verification circuit of the receiving apparatus is configured to allow the requesting apparatus to use the receiving apparatus to execute the requested given processing when the verification success is confirmed by the authentication server.

3. The information processing system of claim 1, wherein when the requesting apparatus transmits the execution request of given processing to the receiving apparatus, the requesting apparatus is configured to transmit to the receiving apparatus user information of a user that uses the requesting apparatus together with the identification information of the authentication server of the requesting apparatus and the execution request of given processing,
when the verification circuit of the receiving apparatus determines that the authentication server of the receiving apparatus and the authentication server of the requesting apparatus are not identical, the authentication server of the receiving apparatus is configured to authenticate the receiving apparatus based on the user information received from the requesting apparatus, and
when the verification circuit of the receiving apparatus verifies authentication of the user information of the receiving apparatus, the receiving apparatus allows the requesting apparatus to use the receiving apparatus to execute the requested given processing.

4. The information processing system of claim 3, wherein when the verification circuit of the receiving apparatus does not verify authentication of the user information of the requesting apparatus, the receiving apparatus is configured to receive other information input into the requesting apparatus for authentication, the authentication server of the receiving apparatus is configured to authenticate the receiving apparatus based on the other information, and
when the verification circuit of the receiving apparatus verifies authentication of the user information of the receiving apparatus, the receiving apparatus allows the requesting apparatus to use the receiving apparatus to execute the requested given processing.

5. The information processing system of claim 1, wherein each of the information processing apparatuses includes a memory that is configured to store use-allowable function information that specifies functions that each user is allowed to use at each of the information processing apparatuses, when the requesting apparatus requests the receiving apparatus to execute the requested processing, the the requesting apparatus is configured to transmit to the receiving apparatus user identification information of a user that uses the requesting apparatus together with the execution request of the given processing and the identification information of an authentication server of the requesting apparatus, when the receiving apparatus allows the requesting apparatus to use the receiving apparatus to execute the requested given processing, the verification circuit of the receiving apparatus is configured to determine, based on the user identification information received from the requesting apparatus and the use-allowable function information stored in the receiving apparatus, whether a function to be used is allowed to be used by the user designated by the user identification information, when the verification circuit of the receiving apparatus determines that the use of the function is allowed at the receiving apparatus, the receiving apparatus is configured to execute the requested process, and when the verification circuit of the receiving apparatus determines that the use of the function is not allowed at the receiving apparatus, the receiving apparatus is configured to not execute the requested process.

6. The information processing system of claim 1, wherein each of the information processing apparatuses includes a memory that is configured to store use-allowable function information that specifies functions that each user is allowed to use at each of the information processing apparatuses, when the requesting apparatus requests the receiving apparatus to execute the requested processing, the requesting apparatus is configured to transmit to the receiving apparatus use-allowable function information specifying the functions that a user is allowed to use at the requesting apparatus together with the execution request of the given processing and the identification information of an authentication server of the requesting apparatus, when the receiving apparatus allows the user of the requesting apparatus to use the receiving apparatus to execute the requested given processing, the verification circuit of the receiving apparatus is configured to determine, based on the use-allowable function information received from the requesting apparatus via the receiving apparatus, whether a function to be used is allowed to be used by the user designated by the user identification information at the requesting apparatus, when the verification circuit of the receiving apparatus determines that the use of the function is allowed at the requesting apparatus, receiving apparatus is configured to execute the requested process, and when the verification circuit of the receiving apparatus determines that the use of the function is not allowed at the receiving apparatus, the receiving apparatus is configured to not execute the requested process.

7. The information processing system of claim 1, wherein each of the information processing apparatuses includes a memory configured to store use-allowable function information that specifies functions that each user is allowed to use at each of the information processing apparatuses, when the requesting apparatus requests the receiving apparatus to execute the requested processing, the requesting apparatus is configured to transmit to the receiving apparatus user identification information to identify a user that uses the requesting apparatus, and use-allowable function information set to the requesting apparatus together with the execution request of the given processing and the identification information of an authentication server of the requesting apparatus, when the receiving apparatus allows the user of the requesting apparatus to use the receiving apparatus to execute the requested given processing, the verification circuit of the receiving apparatus is configured to determine, based on the user identification information and use-allowable function information received from the requesting apparatus and use-allowable function information stored in the receiving apparatus, whether a function to be used is allowed to be used by the user designated by the user identification information at both of the requesting apparatus and the receiving apparatus, when the verification circuit of the receiving apparatus determines that the use of the function is allowed at both of the requesting apparatus and the receiving apparatus, the receiving apparatus is configured to execute the requested process, and when the verification circuit of the receiving apparatus determines that the use of the function is not allowed at any one of the process requester apparatus and the receiving apparatus, the receiving apparatus is configured to not execute the requested process.

8. An information processing apparatus configured for use in an information processing system including a first and second plurality of information processing apparatuses communicably connected to a plurality of authentication servers via one or more networks, the information processing apparatus comprising:

a transmitter; and
a verification circuit, wherein the first and second plurality of information processing apparatuses and the plurality of authentication servers are grouped into a plurality of groups including at least a first group and a second group, the first group includes the first plurality of information processing apparatuses and a first authentication server communicably connected to each other, the first authentication server is configured to store user information of one or more users that use the information processing apparatuses in the first group, the first authentication server is configured to authenticate users that use each of the information processing apparatuses in the first group by comparing the stored user information and user information input by a user to any one of the first plurality of information processing apparatuses, and when the stored user information and the input user information input are identical, the first authentication server is configured to issue a user verification success to the information processing apparatus that transmitted the user information to the first authentication server, and the information processing apparatus is configured to allow the user to use the information processing apparatus, the second group including the second plurality of information processing apparatuses and a second authentication server connected to each other, the second authentication server is configured to store user information of one or more users that use the information processing apparatuses in the second group, the second authentication server is configured to authenticate users that use each of the information processing apparatuses in the second group by comparing the stored user information and user information input by a user to any one of the second plurality of information processing apparatuses, and when the stored user information and the input user information input are identical, the second authentication server is configured to issue a user verification success to the information processing apparatus that transmitted the user information to the second authentication server, and the information processing apparatus is configured to allow the user to use the information processing apparatus, when one information processing apparatus requests another information processing apparatus to execute a given processing:

the one information processing apparatus is configured to act as a requesting apparatus and the other information processing apparatus is configured to act as a receiving apparatus;

the requesting apparatus is configured to transmit job data to the receiving apparatus, the job data including an identification information of the authentication server in the group of the requesting apparatus and the execution request of the given processing, the receiving apparatus is configured to receive the job data including the identification information, the verification circuit of the receiving apparatus is configured to compare the received identification information with identification information of the authentication server that the receiving apparatus uses for user authentication, and when the verification circuit of the receiving apparatus determines that the received identification information is identical to the identification information of the authentication server that the receiving apparatus uses for user authentication, the receiving apparatus is configured to allow the requesting apparatus to use the receiving apparatus to execute the requested given processing.

9. The information processing apparatus of claim 8, wherein when the verification circuit of the receiving apparatus determines that the authentication server of the receiving apparatus and the authentication server of the requesting apparatus are not identical, the receiving apparatus is configured to demand user information from the requesting apparatus, receive the user information from the requesting apparatus, and transmit the user information to the authentication server, the authentication server used by the receiving apparatus is configured to conduct the user authentication based on the user information received from the requesting apparatus, and when the verification circuit of the receiving apparatus verifies authentication of the user information of the receiving apparatus, the receiving apparatus allows the requesting apparatus to use the receiving apparatus to execute the requested given processing.

10. The information processing apparatus of claim 8, wherein when the requesting apparatus transmits the execution request of given processing to the receiving apparatus, the requesting apparatus is configured to transmit to the receiving apparatus user information of a user that uses the requesting apparatus together with the identification information of the authentication server of the requesting apparatus and the execution request of given processing, when the verification circuit of the receiving apparatus determines that the authentication server of the receiving apparatus and the authentication server of the requesting apparatus are not identical, the authentication server of the receiving apparatus is configured to authenticate the receiving apparatus based on the user information received from the requesting apparatus, and when the verification circuit of the receiving apparatus verifies authentication of the user information of the receiving apparatus, the receiving apparatus allows the requesting apparatus to use the receiving apparatus to execute the requested given processing.

11. The information processing apparatus of claim 10, wherein when the verification circuit of the receiving apparatus does not verify authentication of the user information of the requesting apparatus, the receiving apparatus is configured to receive other information input into the requesting apparatus for authentication, the authentication server of the receiving apparatus is configured to authenticate the receiving apparatus based on the other information, and when the verification circuit of the receiving apparatus verifies authentication of the user information of the receiving apparatus, the receiving apparatus allows the requesting apparatus to use the receiving apparatus to execute the requested given processing.

12. The information processing apparatus of claim 8, wherein each of the information processing apparatuses includes a memory that is configured to store use-allowable function information that specifies functions that each user is allowed to use at each of the information processing apparatuses, when the requesting apparatus requests the receiving apparatus to execute the requested processing, the requesting apparatus is configured to transmit to the receiving apparatus user identification information to of a user that uses the requesting apparatus together with the execution request of the given processing and the identification information of an authentication server of the requesting apparatus, when the receiving apparatus allows the requesting apparatus to use the receiving apparatus to execute the requested given processing, the verification circuit of the receiving apparatus is configured to determine, based on the user identification information received from the requesting apparatus and the use-allowable function information stored in the receiving apparatus, whether a function to be used is allowed to be used by the user designated by the user identification information, when the verification circuit of the receiving apparatus determines that the use of the function is allowed at the receiving apparatus, the receiving apparatus is configured to execute the requested process, and when the verification circuit of the receiving apparatus determines that the use of the function is not allowed at the receiving apparatus, the receiving apparatus is configured to not execute the requested process.

13. The information processing apparatus of claim 8, wherein each of the information processing apparatuses includes a memory that is configured to store use-allowable function information that specifies functions that each user is allowed to use at each of the information processing apparatuses, when the requesting apparatus requests the receiving apparatus to execute the requested processing, the requesting apparatus is configured to transmit to the receiving apparatus use-allowable function information specifying the functions that a user is allowed to use at the requesting apparatus together with the execution request of the given processing and the identification information of an authentication server of the requesting apparatus, when the receiving apparatus allows the user of the requesting apparatus to use the receiving apparatus to execute the requested given processing, the verification circuit of the receiving apparatus is configured to determine, based on the use-allowable function information received from the requesting apparatus via the receiving apparatus, whether a function to be used is allowed to be used by the user designated by the user identification information at the requesting apparatus, when the verification circuit of the receiving apparatus determines that the use of the function is allowed at the requesting apparatus, the receiving apparatus is configured to execute the requested process, and when the verification circuit of the receiving apparatus determines that the use of the function is not allowed at the receiving apparatus, the receiving apparatus is configured to not execute the requested process.

14. The information processing apparatus of claim 8, wherein each of the information processing apparatuses includes a memory that is configured to store use-allowable function information that specifies functions that each user is allowed to use at each of the information processing apparatuses, when the requesting apparatus requests the receiving apparatus to execute the requested processing the requesting apparatus is configured to transmit to the receiving apparatus user identification information to identify a user that uses the requesting apparatus, and use-allowable function information set to the requesting apparatus together with the execution request of the given processing and the identification information of an authentication server of the requesting apparatus when the receiving apparatus allows the user of the requesting apparatus to use the receiving apparatus to execute the requested given processing, the verification circuit of the receiving apparatus is configured to determine, based on the user identification information and use-allowable function information received from the requesting apparatus and use-allowable function information stored in the receiving apparatus, whether a function to be used is allowed to be used by the user designated by the user identification information at both of the requesting apparatus and the receiving apparatus, when the verification circuit of the receiving apparatus determines that the use of the function is allowed at both of the requesting apparatus and the receiving apparatus, the receiving apparatus is configured to execute the requested process, and when the verification circuit of the receiving apparatus determines that the use of the function is not allowed at any one of the process requester apparatus and the receiving apparatus, the receiving apparatus is configured to not execute the requested process.

15. A non-transitory computer-readable medium storing a program product configured to cause an information processing system to perform a method of processing information, the information processing system including a first and second plurality of information processing apparatuses, each of the information processing apparatuses including a transmitter and a verification circuit, and a plurality of authentication servers communicably connected to the first and second plurality of information processing apparatuses via one or more networks, wherein the first and second plurality of information processing apparatuses and the plurality of authentication servers are grouped into a plurality of groups including at least a first group and a second group, the first group includes the first plurality of information processing apparatuses and a first authentication server communicably connected to each other, the first authentication server is configured to store user information of one or more users that use the information processing apparatuses in the first group, the first authentication server is configured to authenticate users that use each of the information processing apparatuses in the first group by comparing the stored user information and user information input by a user to any one of the first plurality of information processing apparatuses, when the stored user information and the input user information input are identical, the first authentication server is configured to issue a user verification success to the information processing apparatus that transmitted the user information to the first authentication server, and the information processing apparatus is configured to allow the user to use the information processing apparatus, and the second group includes the second plurality of information processing apparatuses and a second authentication server connected to each other, the second authentication server is configured to store user information of one or more users that use the information processing apparatuses in the second group, the second authentication server is configured to authenticate users that use each of the information processing apparatuses in the second group by comparing the stored user information and user information input by a user to any one of the second plurality of information processing apparatuses, when the stored user information and the input user information input are identical, the second authentication server is configured to issue a user verification success to the information processing apparatus that transmitted the user information to the second authentication server, and the information processing apparatus is configured to allow the user to use the information processing apparatus, the method comprising:

receiving a request to execute a given processing at one information processing apparatus from another information processing apparatus, the one information processing apparatus is configured to act as a receiving apparatus and the other information processing apparatus is configured to act as a requesting apparatus;

receiving, at the receiving apparatus, job data including an identification information of the authentication server in the group of the requesting apparatus and the execution request of the given processing;

comparing the received identification information with identification information of the authentication server that the receiving apparatus uses for user authentication;

determining whether the received identification information is identical to the identification information of the authentication server that the receiving apparatus uses for user authentication; and when the received identification information is identical to the identification information of the authentication server that the receiving apparatus uses for user authentication, allowing the requesting apparatus to use the receiving apparatus to execute the requested given processing.

16. The non-transitory computer-readable medium of claim 15, the method further comprising:
   demanding user information from the requesting apparatus when it is determined that the authentication server of the receiving apparatus and the authentication server of the requesting apparatus are not identical;
   transmitting the user information to the first authentication server;
   conducting the user authentication based on the user information received from the requesting apparatus; and
   allowing the requesting apparatus to use the receiving apparatus to execute the requested given processing when verification success is confirmed by the first authentication server.

17. The non-transitory computer-readable medium of claim 15, the method further comprising the:
   when transmitting the execution request of given processing to the receiving apparatus, further transmitting user information of a user that uses the requesting apparatus together with the identification information of the authentication server of the requesting apparatus and the execution request of given processing;
   when it is determined that the authentication server of the receiving apparatus and the authentication server of the requesting apparatus are not identical authenticating the receiving apparatus based on the user information received from the requesting apparatus; and
   allowing the requesting apparatus to use the receiving apparatus to execute the requested given processing when verification success is confirmed by the authentication server.

18. The non-transitory computer-readable medium of claim 17, the method further comprising:
   when the verification circuit of the receiving apparatus does not verify authentication of the user information of the requesting apparatus, inputting other information to the receiving apparatus for authentication;
   authenticating the receiving apparatus based on the other information; and
   allowing the requesting apparatus to use the receiving apparatus to execute the requested given processing when verification success is confirmed by the authentication server.

19. The non-transitory computer-readable medium of claim 15, wherein each of the information processing apparatuses includes a memory that is configured to store use-allowable function information that specifies functions that each user is allowed to use at each of the information processing apparatuses,
   the method further comprising:
   when the execution of the requested processing is requested, transmitting user identification information of a user that uses the requesting apparatus together with the execution request of the given processing and the identification information of an authentication server of the requesting apparatus;
   when the requesting apparatus is allowed to use the receiving apparatus to execute the requested given processing, determining, based on the user identification information received from the requesting apparatus and the use-allowable function information stored in the receiving apparatus, whether a function to be used is allowed to be used by the user designated by the user identification information by using the verification unit of the receiving apparatus;
   executing the requested process when it is determined that the use of the function is allowed; and
   not executing the requested process when it is determined that the use of the function is not allowed.

20. The non-transitory computer-readable medium of claim 15, wherein each of the information processing apparatuses includes a memory that is configured to store use-allowable function information that specifies functions that each user is allowed to use at each of the information processing apparatuses,
   the method further comprising:
   when the execution of the requested processing is requested, transmitting use-allowable function information specifying the functions that a user is allowed to be used at the requesting apparatus together with the execution request of the given processing and the identification information of an authentication server of the requesting apparatus;
   when the requesting apparatus is allowed to use the receiving apparatus to execute the requested given processing, determining, based on the use-allowable function information received from the requesting apparatus via the receiving apparatus, whether a function to be used is allowed to be used by the user designated by the user identification information at the requesting apparatus by using the verification unit of the receiving apparatus;
   executing the requested process when it is determined that the use of the function is allowed; and
   not executing the requested process when it is determined that the use of the function is not allowed.

* * * * *